(12) United States Patent
Casella et al.

(10) Patent No.: US 11,393,164 B2
(45) Date of Patent: Jul. 19, 2022

(54) DEVICE, METHOD, AND GRAPHICAL USER INTERFACE FOR GENERATING CGR OBJECTS

(71) Applicant: Apple Inc., Cupertino, CA (US)

(72) Inventors: Tyler Casella, San Mateo, CA (US); David Lui, San Jose, CA (US); Xiao Jin Yu, Sunnyvale, CA (US); Kyle Ellington Fisher, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/403,835

(22) Filed: May 6, 2019

(65) Prior Publication Data

US 2020/0357169 A1 Nov. 12, 2020

(51) Int. Cl.
*G06T 17/05* (2011.01)
*G06T 15/00* (2011.01)
*G06T 15/04* (2011.01)

(52) U.S. Cl.
CPC .............. *G06T 17/05* (2013.01); *G06T 15/04* (2013.01); *G06T 2200/04* (2013.01); *G06T 2200/08* (2013.01); *G06T 2200/24* (2013.01)

(58) Field of Classification Search
CPC ........ G06T 17/05; G06T 15/00; G06T 19/006
See application file for complete search history.

(56) References Cited

U.S. PATENT DOCUMENTS

| 2003/0063116 | A1* | 4/2003 | Parker | G06Q 30/06 715/719 |
| 2003/0076336 | A1* | 4/2003 | Fukao | G09G 5/02 345/589 |
| 2004/0207641 | A1* | 10/2004 | Palm | H04N 19/597 345/619 |
| 2008/0182561 | A1* | 7/2008 | Kim | G06F 16/381 455/414.1 |
| 2009/0303507 | A1* | 12/2009 | Abeloe | B29C 64/386 358/1.9 |
| 2010/0188707 | A1* | 7/2010 | Gassman | G03B 15/00 358/1.18 |
| 2011/0043540 | A1* | 2/2011 | Fancher | H04N 13/261 345/672 |
| 2011/0164029 | A1* | 7/2011 | King | G06F 3/04883 345/419 |

(Continued)

FOREIGN PATENT DOCUMENTS

EP 2602792 A2 6/2013

OTHER PUBLICATIONS

First Examination Report for corresponding Indian Application No. 202117040110 dated Mar. 15, 2022.

*Primary Examiner* — Yi Yang
(74) *Attorney, Agent, or Firm* — Fernando & Partners, LLP

(57) ABSTRACT

In one embodiment, a method of generating a 3D object is performed by a device including a processor, non-transitory memory, and one or more input devices. The method includes receiving, via one or more input devices, a user input selecting a file representing two-dimensional (2D) content and having a file type. The method includes receiving, via the one or more input devices, a user input requesting generation of a three-dimensional (3D) object based on the file. The method includes generating, based on the file type, a 3D object representing the 2D content.

27 Claims, 33 Drawing Sheets

(56) References Cited

U.S. PATENT DOCUMENTS

| | | | |
|---|---|---|---|
| 2011/0221846 A1* | 9/2011 | Smith | G06K 1/121 |
| | | | 347/107 |
| 2013/0162646 A1* | 6/2013 | Lerios | G06T 11/001 |
| | | | 345/428 |
| 2014/0300566 A1 | 10/2014 | Lee et al. | |
| 2015/0123966 A1* | 5/2015 | Newman | G06T 19/006 |
| | | | 345/419 |
| 2015/0248504 A1 | 9/2015 | Glunz | |
| 2016/0180379 A1* | 6/2016 | Salmon | G06Q 30/0255 |
| | | | 705/14.53 |
| 2016/0193530 A1* | 7/2016 | Parker | A63F 13/23 |
| | | | 463/29 |
| 2017/0085863 A1 | 3/2017 | Lopez et al. | |

* cited by examiner

900

Receiving, via one or more input devices, a user input selecting a file representing two-dimensional (2D) content and having a file type — 910

Receiving, via the one or more input devices, a user input requesting generation of a three-dimensional (3D) object based on the file — 920

Generating, based on the file type, a 3D object representing the 2D content — 930

Figure 9

DEVICE, METHOD, AND GRAPHICAL USER INTERFACE FOR GENERATING CGR OBJECTS

TECHNICAL FIELD

This relates generally to electronic devices with touch-sensitive surfaces, including but not limited to electronic devices with touch-sensitive surfaces that generate computer-generated reality (CGR) objects.

BACKGROUND

Various computer-aided design (CAD) tools exist to assist in generating three-dimensional objects, each associated with a wireframe and one or more texture images. However, generating a three-dimensional object can be a difficult and time-consuming process.

SUMMARY

Accordingly, there is a need for electronic devices with faster, more efficient methods and interfaces for composing computer-generated reality (CGR) files. Such methods and interfaces optionally complement or replace conventional methods for composing CGR files. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, and one or more input devices. The method includes receiving, via one or more input devices, a user input selecting a file representing two-dimensional (2D) content and having a file type. The method includes receiving, via the one or more input devices, a user input requesting generation of a three-dimensional (3D) object based on the file. The method includes generating, based on the file type, a 3D object representing the 2D content.

In accordance with some embodiments, an electronic device includes a display, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and one or more input devices, cause the device to perform or cause performance of the operations of any of the methods described herein. In accordance with some embodiments, a graphical user interface on an electronic device with a display, one or more input devices, a non-transitory memory, and one or more processors configured to execute one or more programs stored in the non-transitory memory, including one or more of the elements displayed in any of the methods described above, which are updated in response to inputs, as described in any of the methods described herein. In accordance with some embodiments, an electronic device includes: a display, one or more input devices; and means for performing or causing performance of the operations of any of the methods described herein. In accordance with some embodiments, an information processing apparatus, for use in an electronic device with a display and one or more input devices, includes means for performing or causing performance of the operations of any of the methods described herein.

Thus, electronic devices with displays and input devices, such as touch-sensitive surfaces are provided with faster, more efficient methods and interfaces for composing CGR files, thereby increasing the effectiveness, efficiency, and user satisfaction with such devices. Such methods and interfaces may complement or replace conventional methods for composing CGR files.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 9 illustrates a flow diagram of a method of generating a 3D object in accordance with some embodiments.

DESCRIPTION OF EMBODIMENTS

In accordance with various embodiments, a graphical user interface (GUI) is provided to simplify the generation of a 3D object based on a file representing 2D content, such as an image, video, or text. In various embodiments, a wireframe is selected based on a file type of the file (e.g., an image file or video file) and one or more texture images are generated representing the 2D content.

Figure 5:
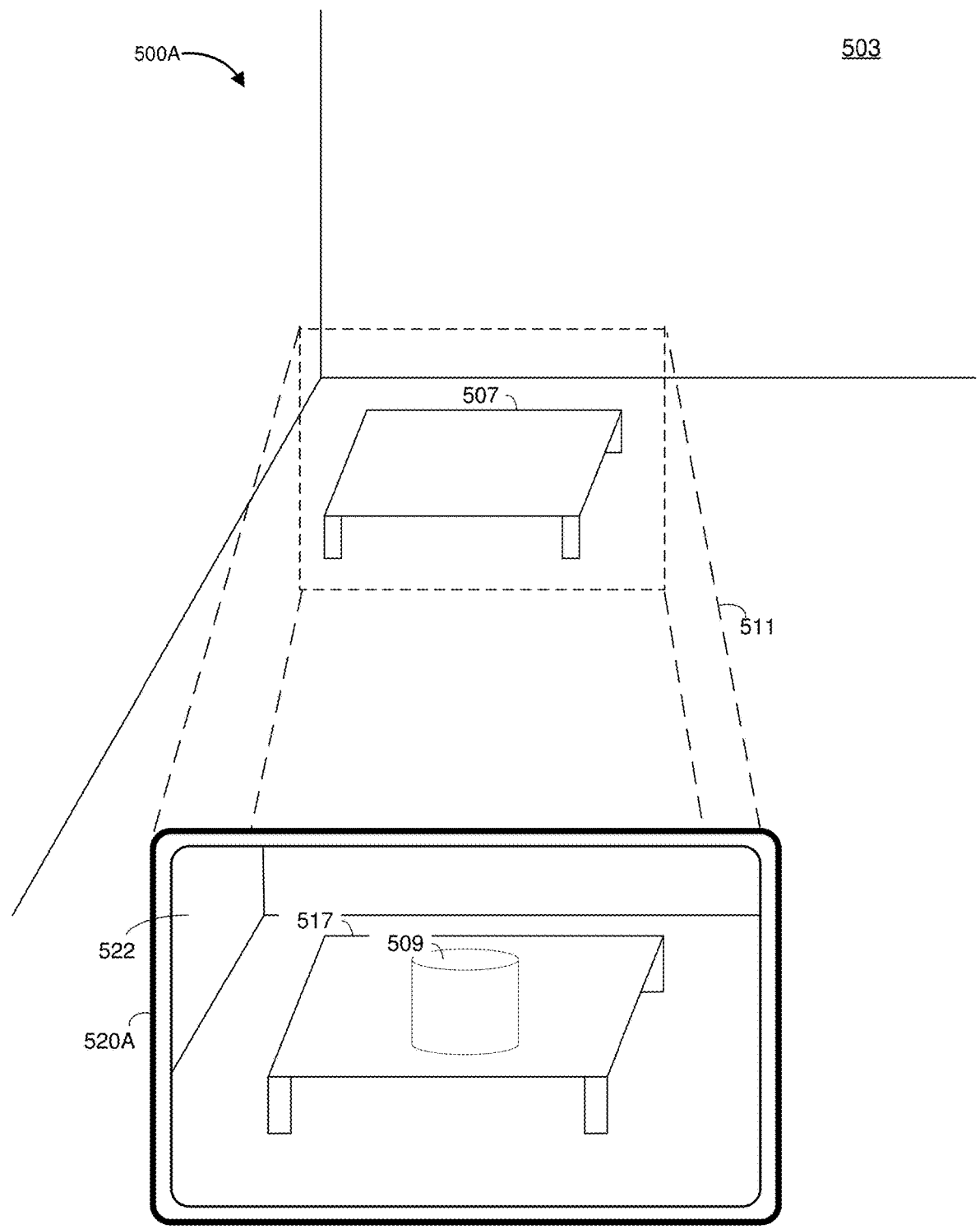
FIG. 5 is a block diagram of an example operating architecture in accordance with some embodiments.
Figure 6:
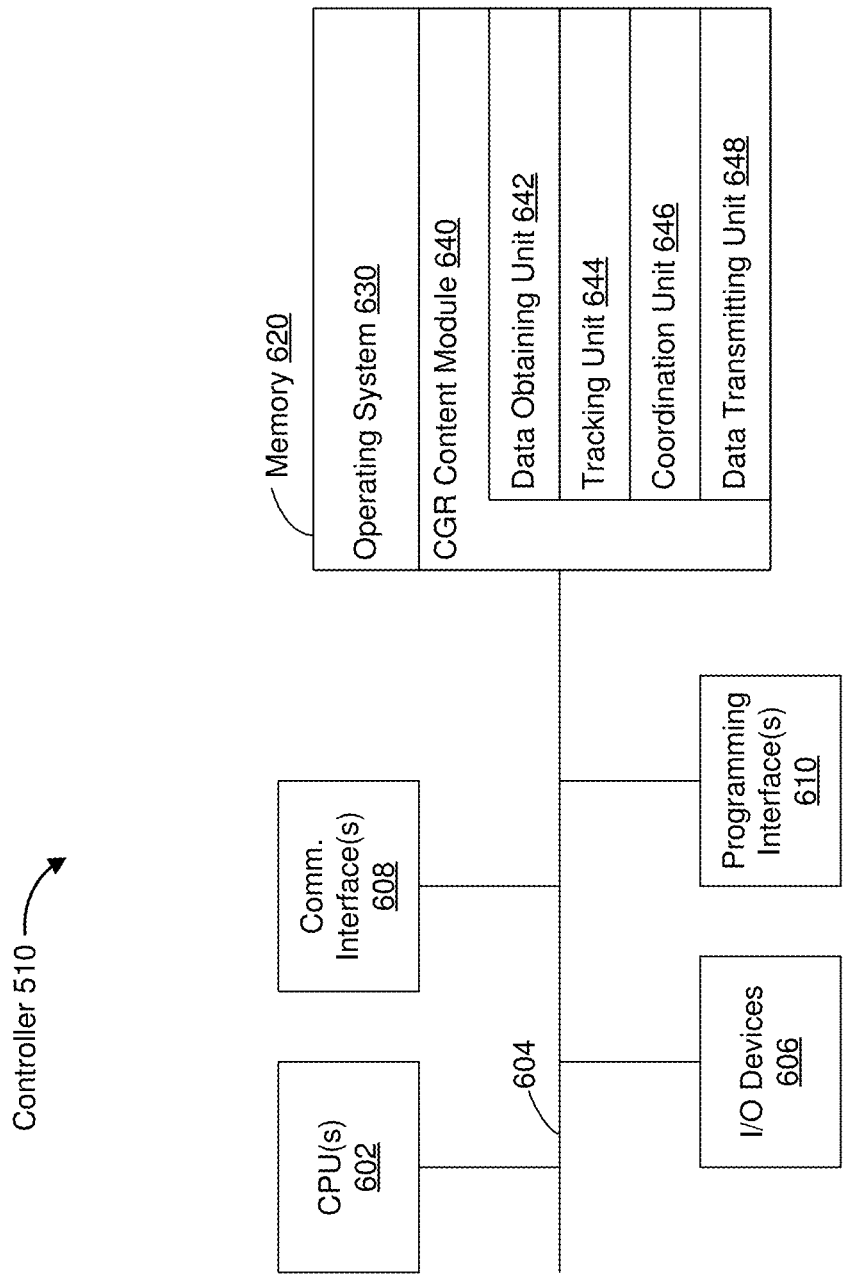
FIG. 6 is a block diagram of an example controller in accordance with some embodiments.
Figure 7:
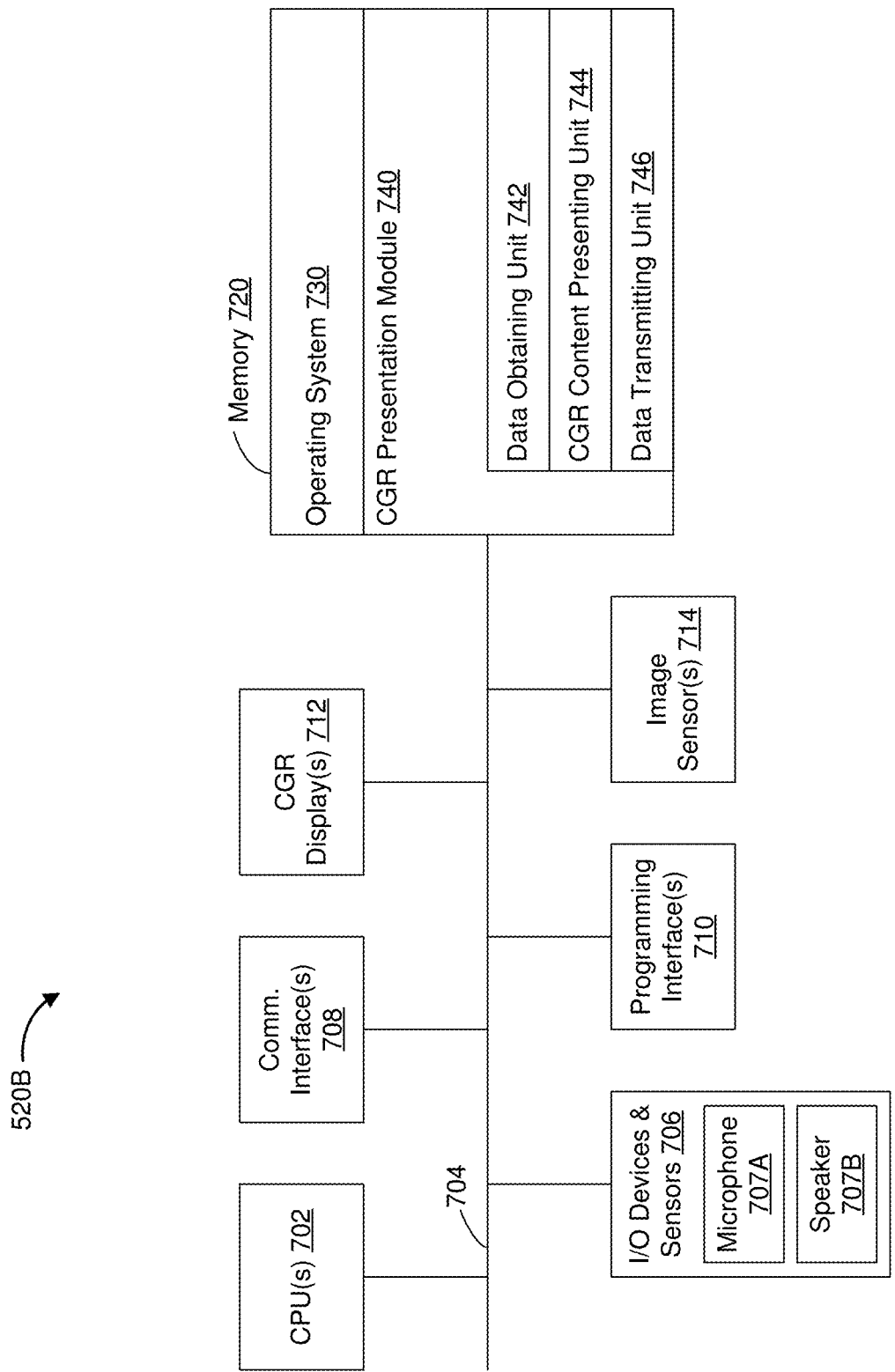
FIG. 7 is a block diagram of an example head-mounted device (HMD) in accordance with some embodiments.
Figure 8A:
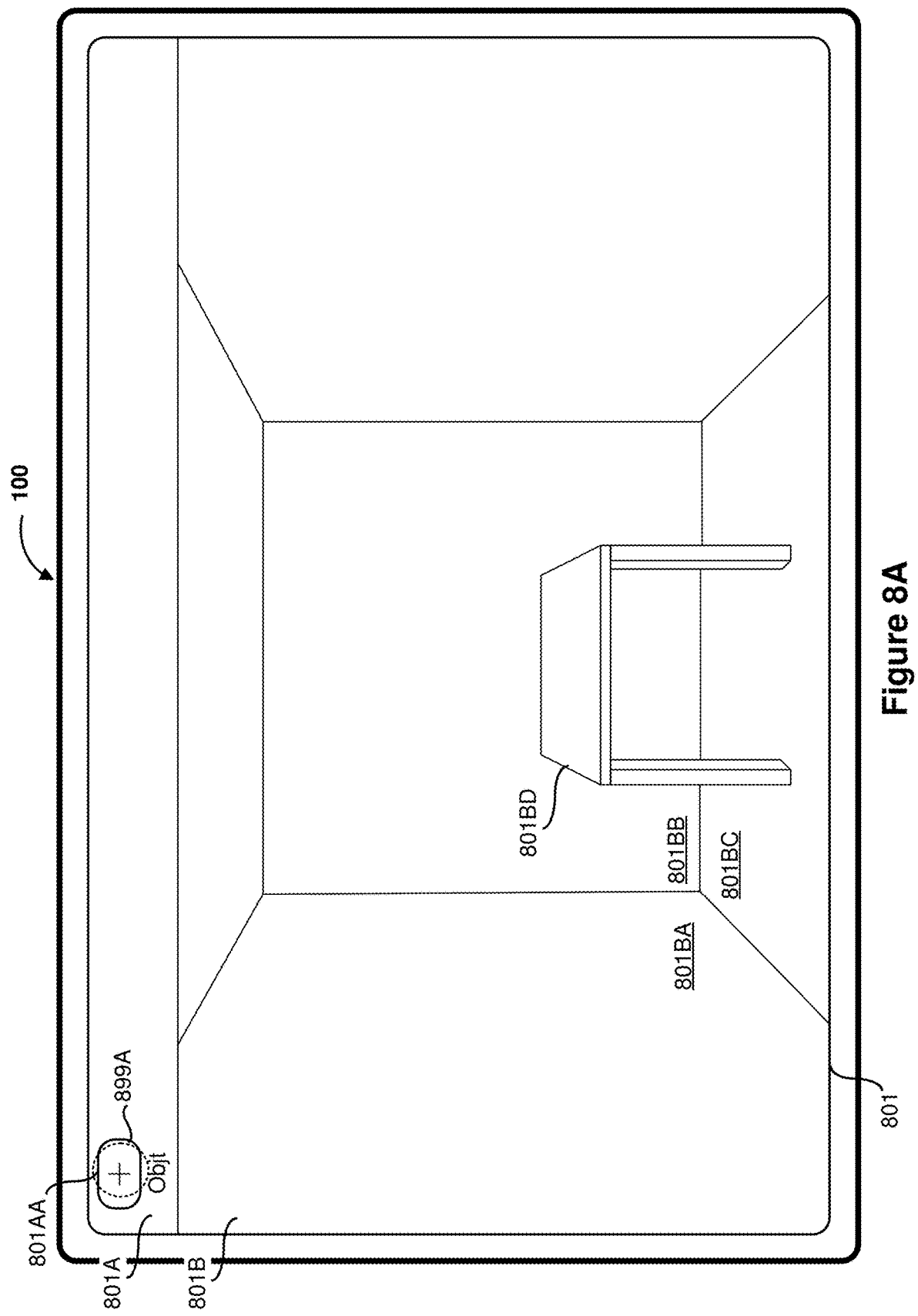
FIGS. 8A-8W illustrate example user interfaces for generating 3D objects in accordance with some embodiments.

Below, FIGS. 1A-1B, 2-3, and 4A-4B provide a description of example CGR object generating devices. FIGS. 5, 6, and 7 provide a description of example CGR object presenting devices. FIGS. 8A-8W illustrate example user interfaces for generating 3D objects. The user interfaces in FIGS. 8A-8W are used to illustrate the process in FIG. 9.

Example CGR Object Generating Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
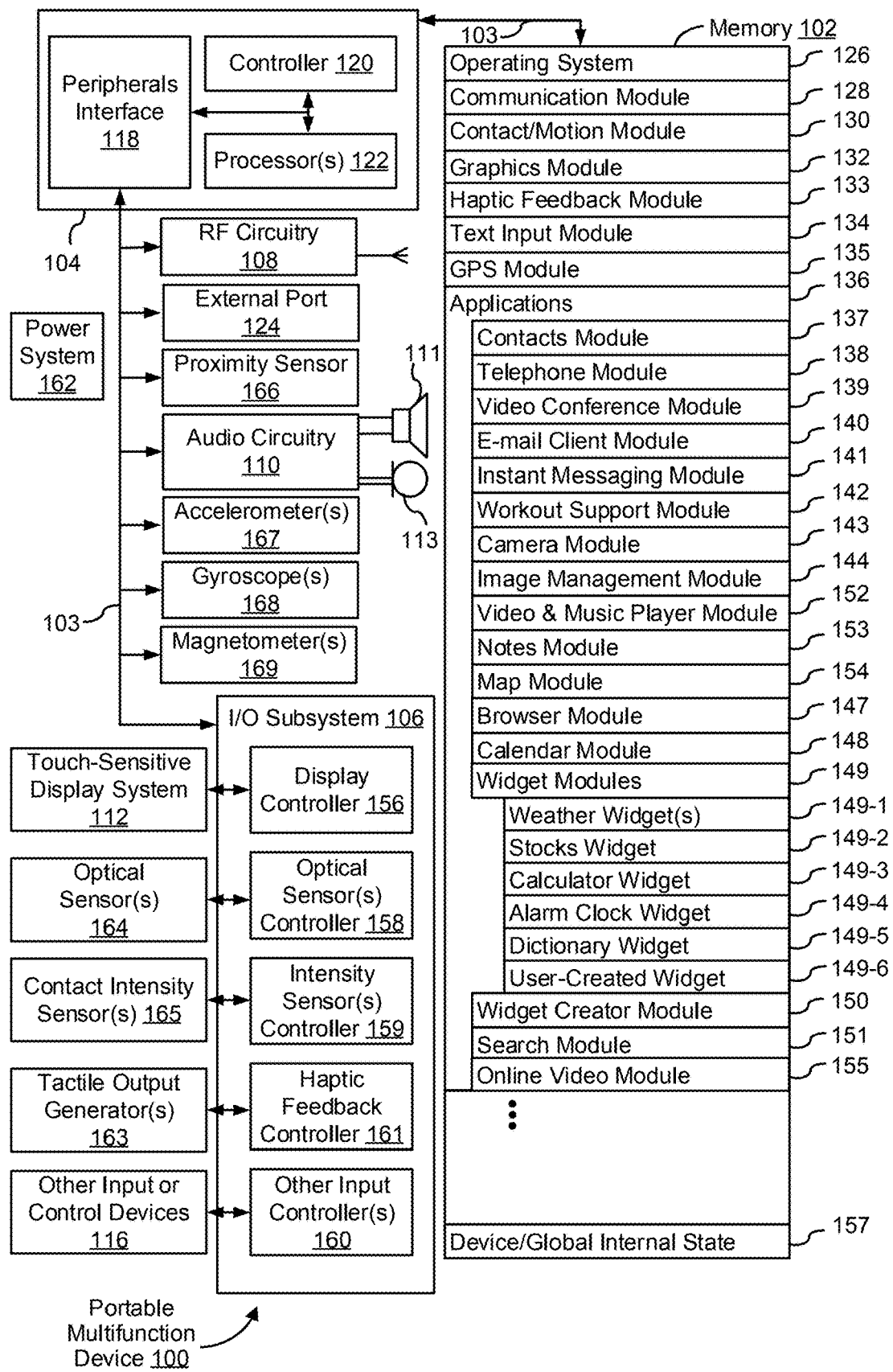
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

Figure 3:
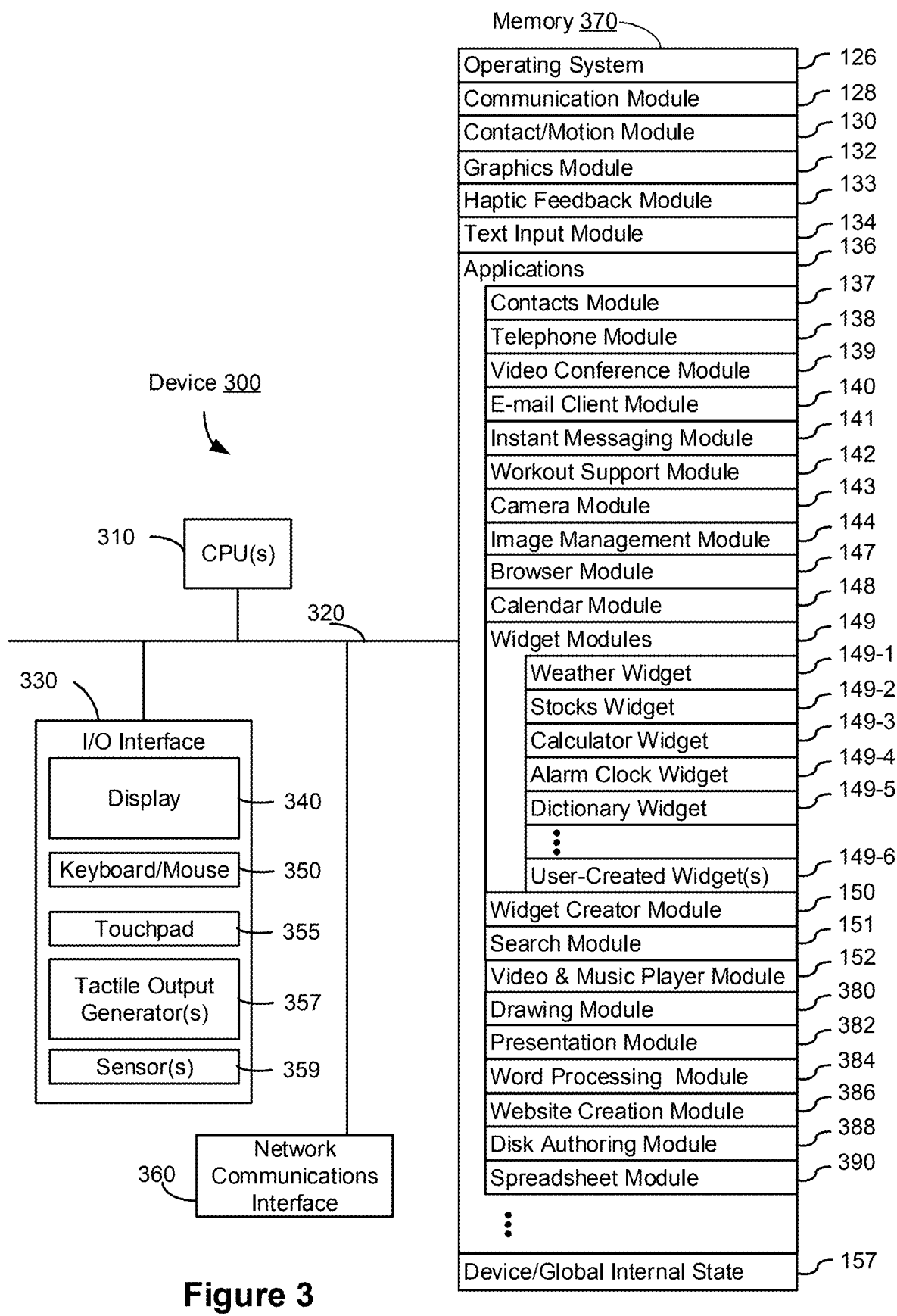
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
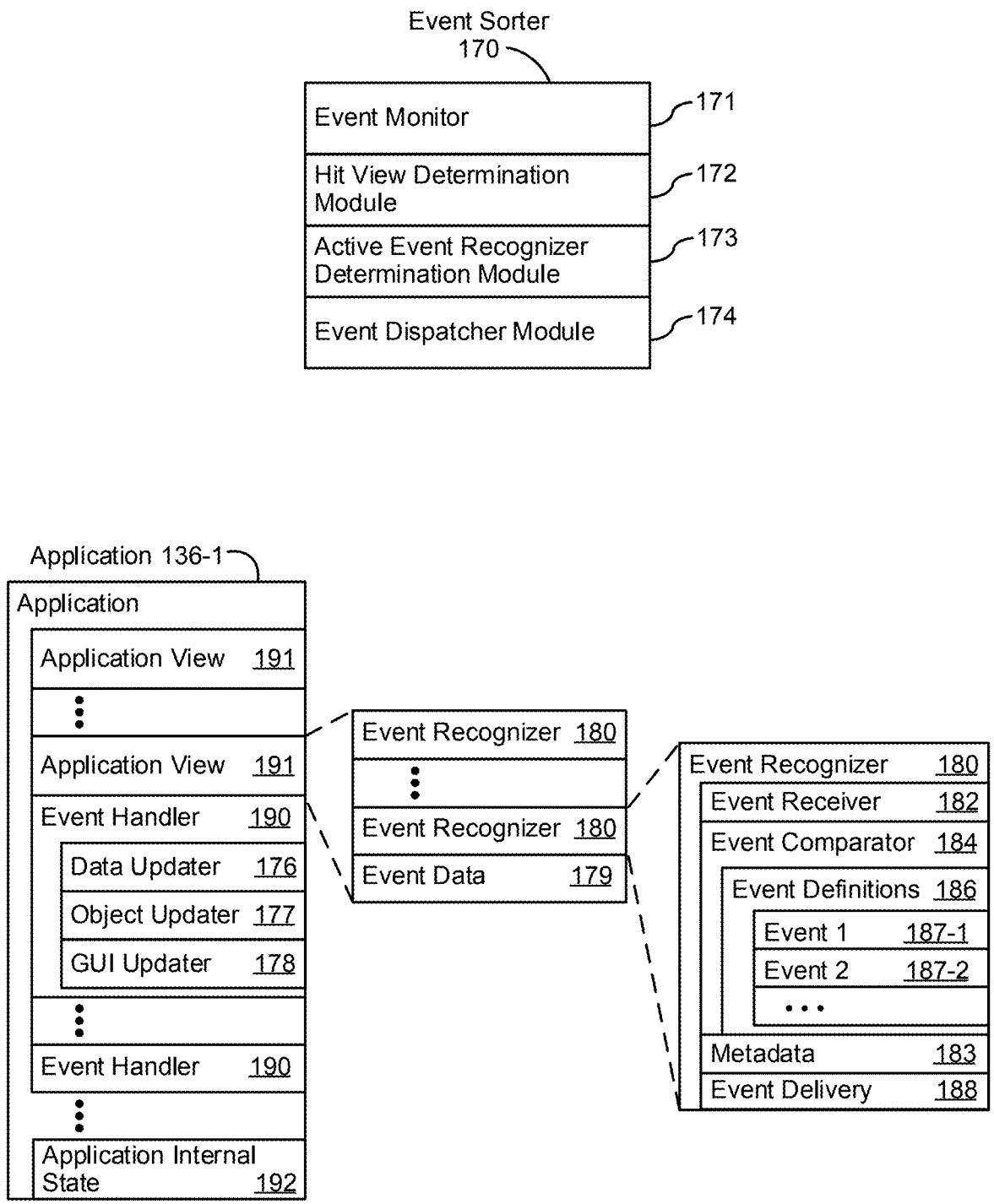
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
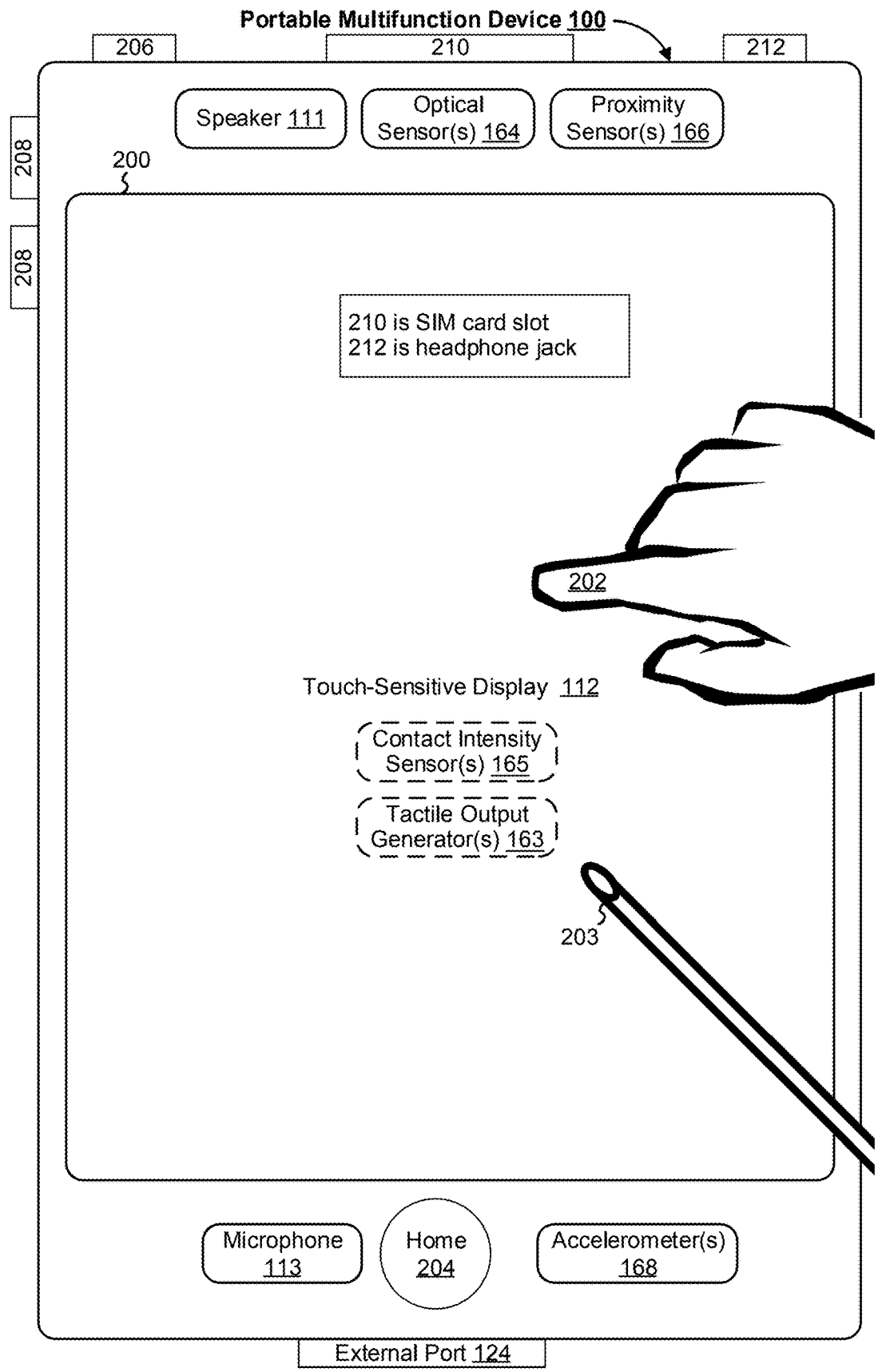
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some embodiments or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
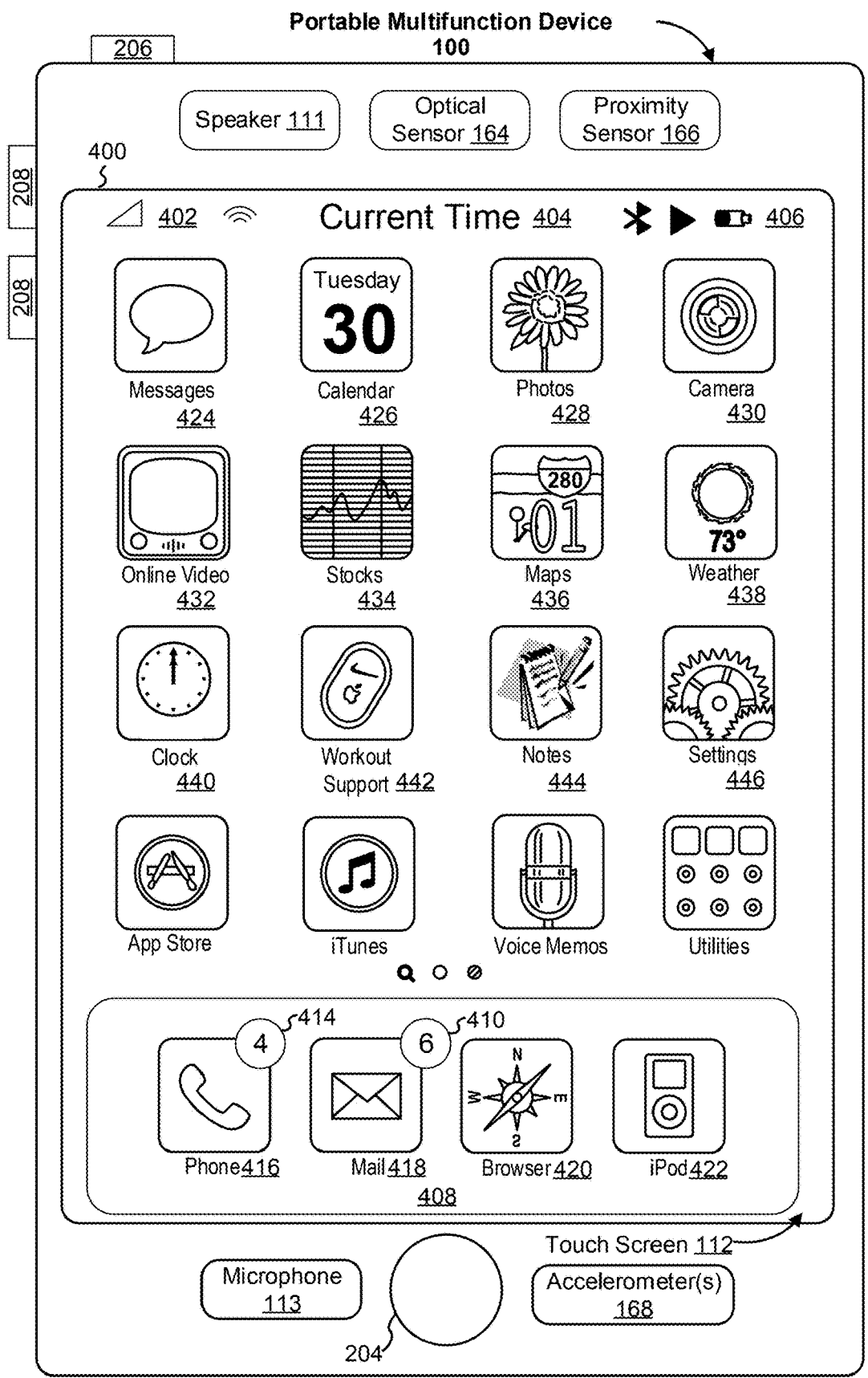
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";

Icon 438 for weather widget 149-1, labeled "Weather";
Icon 440 for alarm clock widget 169-6, labeled "Clock";
Icon 442 for workout support module 142, labeled "Workout Support";
Icon 444 for notes module 153, labeled "Notes"; and
Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
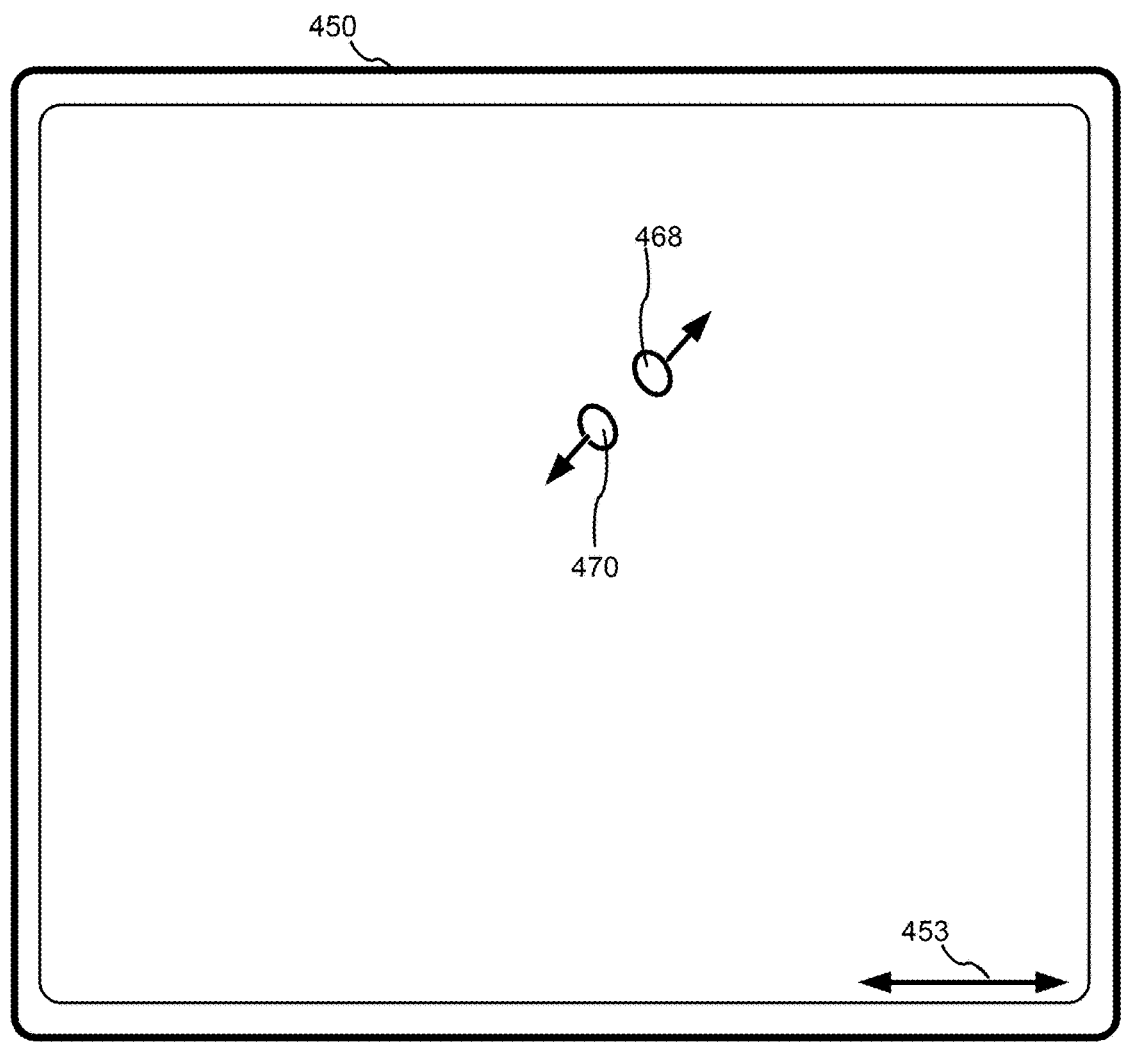
FIG. 4B illustrates an example user interface for a multifunction device with a touch-sensitive surface that is separate from the display in accordance with some embodiments.
Figure 4B:
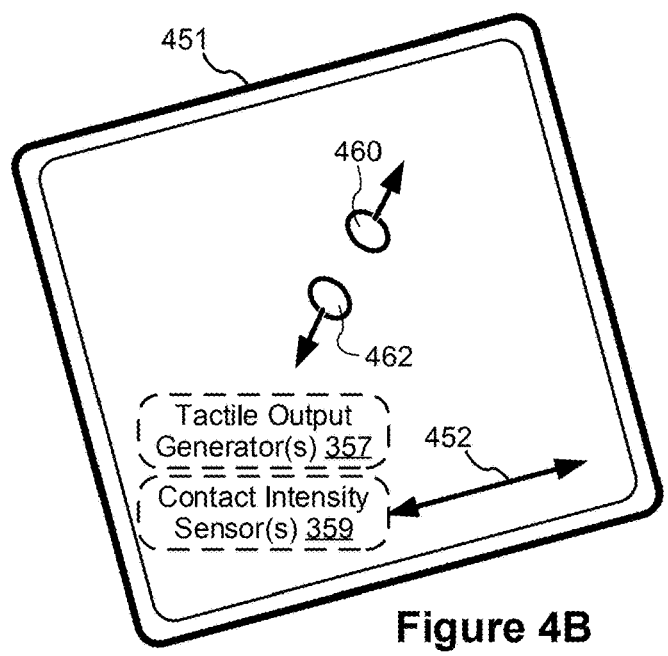

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Example CGR Object Presenting Devices

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 5 is a block diagram of an example operating architecture 500A in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the operating architecture 500A includes an electronic device 520A.

In some embodiments, the electronic device 520A is configured to present CGR content to a user. In some embodiments, the electronic device 520A includes a suitable combination of software, firmware, and/or hardware. According to some embodiments, the electronic device 520A presents, via a display 522, CGR content to the user while the user is physically present within a physical environment 503 that includes a table 507 within the field-of-view 511 of the electronic device 520A. As such, in some embodiments, the user holds the electronic device 520A in his/her hand(s). In some embodiments, while providing augmented reality (AR) content, the electronic device 520A is configured to display an AR object (e.g., an AR cylinder 509) and to enable video pass-through of the physical environment 503 (e.g., including a representation 517 of the table 507) on a display 522.

In some embodiments, an operating environment includes a controller 510 (shown in FIG. 6) and a head-mounted device (HMD) 520B (shown in FIG. 7). In some embodiments, the controller 510 is configured to manage and coordinate presentation of CGR content for the user. In some embodiments, the controller 510 includes a suitable combination of software, firmware, and/or hardware. The controller 510 is described in greater detail below with respect to FIG. 6. In some embodiments, the controller 510 is a computing device that is local or remote relative to a scene.

For example, the controller 510 is a local server located within the scene. In another example, the controller 510 is a remote server located outside of the scene (e.g., a cloud server, central server, etc.). In some embodiments, the controller 510 is communicatively coupled with the HMD 520B via one or more wired or wireless communication channels (e.g., BLUETOOTH, IEEE 802.11x, IEEE 802.16x, IEEE 802.3x, etc.). In another example, the controller 510 is included within the enclosure of the HMD 520B.

In some embodiments, the HMD 520B is configured to present the CGR content to the user. In some embodiments, the HMD 520B includes a suitable combination of software, firmware, and/or hardware. The HMD 520B is described in greater detail below with respect to FIG. 7. In some embodiments, the functionalities of the controller 510 are provided by and/or combined with the HMD 520B.

According to some embodiments, the HMD 520B presents CGR content to the user while the user is virtually and/or physically present within the scene.

In some embodiments, the user wears the HMD 520B on his/her head. As such, the HMD 520B includes one or more CGR displays provided to display CGR content. For example, in various embodiments, the HMD 520B encloses the field-of-view of the user. In some embodiments, such as in FIG. 5, the HMD 520B is replaced with a handheld device (such as a smartphone or tablet) configured to present CGR content, and rather than wearing the HMD 520B the user holds the device with a display directed towards the field-of-view of the user and a camera directed towards the scene. In some embodiments, the handheld device can be placed within an enclosure that can be worn on the head of the user. In some embodiments, the HMD 520B is replaced with a CGR chamber, enclosure, or room configured to present CGR content in which the user does not wear or hold the HMD 520B.

FIG. 6 is a block diagram of an example of the controller 510 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the controller 510 includes one or more processing units 602 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 606, one or more communication interfaces 608 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 610, a memory 620, and one or more communication buses 604 for interconnecting these and various other components.

In some embodiments, the one or more communication buses 604 include circuitry that interconnects and controls communications between system components. In some embodiments, the one or more I/O devices 606 include at least one of a keyboard, a mouse, a touchpad, a joystick, one or more microphones, one or more speakers, one or more image sensors, one or more displays, and/or the like.

The memory 620 includes high-speed random-access memory, such as dynamic random-access memory (DRAM), static random-access memory (SRAM), double-data-rate random-access memory (DDR RAM), or other random-access solid-state memory devices. In some embodiments, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some embodiments, the memory 620 or the non-transitory computer readable storage medium of the memory 620 stores the following programs, modules and data structures, or a subset thereof including an optional operating system 630 and a CGR content module 640.

The operating system 630 includes procedures for handling various basic system services and for performing hardware dependent tasks. In some embodiments, the CGR content module 640 is configured to manage and coordinate presentation of CGR content for one or more users (e.g., a single set of CGR content for one or more users, or multiple sets of CGR content for respective groups of one or more users). To that end, in various embodiments, the CGR content module 640 includes a data obtaining unit 642, a tracking unit 644, a coordination unit 646, and a data transmitting unit 648.

In some embodiments, the data obtaining unit 642 is configured to obtain data (e.g., presentation data, interaction data, sensor data, location data, etc.) from at least the HMD 520B of FIG. 7. To that end, in various embodiments, the data obtaining unit 642 includes instructions and/or logic therefor, and heuristics and metadata therefor.

In some embodiments, the tracking unit 644 is configured to map the scene and to track the position/location of at least the HMD 520B with respect to the scene of FIG. 7. To that end, in various embodiments, the tracking unit 644 includes instructions and/or logic therefor, and heuristics and metadata therefor.

In some embodiments, the coordination unit 646 is configured to manage and coordinate the presentation of CGR content to the user by the HMD 520B. To that end, in various embodiments, the coordination unit 646 includes instructions and/or logic therefor, and heuristics and metadata therefor.

In some embodiments, the data transmitting unit 648 is configured to transmit data (e.g., presentation data, location data, etc.) to at least the HMD 520B. To that end, in various embodiments, the data transmitting unit 648 includes instructions and/or logic therefor, and heuristics and metadata therefor.

Although the data obtaining unit 642, the tracking unit 644, the coordination unit 646, and the data transmitting unit 648 are shown as residing on a single device (e.g., the controller 510), it should be understood that in other embodiments, any combination of the data obtaining unit 642, the tracking unit 644, the coordination unit 646, and the data transmitting unit 648 may be located in separate computing devices.

Moreover, FIG. 6 is intended more as functional description of the various features that may be present in a particular embodiment as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

FIG. 7 is a block diagram of an example of the HMD 520B in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 520B includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 710, one or more CGR displays 712, one or more optional interior- and/or exterior-facing image sensors 714, a memory 720, and one or more communication buses 704 for interconnecting these and various other components.

In some embodiments, the one or more communication buses 704 include circuitry that interconnects and controls communications between system components. In some embodiments, the one or more I/O devices and sensors 706 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 707A, one or more speakers 707B, a haptics engine, one or more depth sensors (e.g., a structured light, a time-of-flight, or the like), and/or the like.

In some embodiments, the one or more CGR displays 712 are configured to display CGR content to the user. In some embodiments, the one or more CGR displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 712 correspond to diffractive, reflective, polarized, holographic, etc. waveguide displays. For example, the HMD 520B includes a single CGR display. In another example, the HMD 520B includes a CGR display for each eye of the user.

In some embodiments, the one or more image sensors 714 are configured to obtain image data that corresponds to at least a portion of the face of the user that includes the eyes of the user (any may be referred to as an eye-tracking camera). In some embodiments, the one or more image sensors 714 are configured to be forward-facing so as to obtain image data that corresponds to the scene as would be viewed by the user if the HMD 520B was not present (and may be referred to as a scene camera). The one or more optional image sensors 714 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 720 includes high-speed random-access memory, such as DRAM, SRAM, DDR RAM, or other random-access solid-state memory devices. In some embodiments, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some embodiments, the memory 720 or the non-transitory computer readable storage medium of the memory 720 stores the following programs, modules and data structures, or a subset thereof including an optional operating system 730 and a CGR presentation module 740.

The operating system 730 includes procedures for handling various basic system services and for performing hardware dependent tasks. In some embodiments, the CGR presentation module 740 is configured to present CGR content to the user via the one or more CGR displays 712 and/or the I/O devices and sensors 706 (such as the one or more speakers 707B). To that end, in various embodiments, the CGR presentation module 740 includes a data obtaining unit 742, a CGR content presenting unit 744, and a data transmitting unit 746.

In some embodiments, the data obtaining unit 742 is configured to obtain data (e.g., presentation data, interaction data, sensor data, location data, etc.) from at least the controller 510 of FIG. 5. In various embodiments, the data obtaining unit obtains a CGR file. To that end, in various embodiments, the data obtaining unit 742 includes instructions and/or logic therefor, and heuristics and metadata therefor.

In some embodiments, the CGR content presenting unit 744 is configured to present CGR content to a user. In various embodiments, the CGR content presenting unit 744 presents CGR content of the CGR file according to rules set forth in the CGR file. To that end, in various embodiments, the CGR content presenting unit 744 includes instructions and/or logic therefor, and heuristics and metadata therefor.

In some embodiments, the data transmitting unit 746 is configured to transmit data (e.g., presentation data, location data, etc.) to at least the controller 510. To that end, in various embodiments, the data transmitting unit 746 includes instructions and/or logic therefor, and heuristics and metadata therefor.

Although the data obtaining unit 742, the CGR content presenting unit 744, and the data transmitting unit 746 are shown as residing on a single device (e.g., the HMD 520B of FIG. 7), it should be understood that in other embodiments, any combination of the data obtaining unit 742, the CGR content presenting unit 744, and the data transmitting unit 746 may be located in separate computing devices.

Moreover, FIG. 7 is intended more as a functional description of the various features that could be present in a particular embodiment as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

Generating a CGR object can be a difficult and time-consuming process, requiring expert knowledge in, for example, 3D object design. This presents a high barrier to the generation of quality CGR applications including such CGR objects. Accordingly, in various embodiments, a graphical user interface (GUI) is provided to simplify the generation of a three-dimensional CGR object based on a file representing two-dimensional content, such as an image, video, or text.

User Interfaces and Associated Processes

Attention is now directed toward embodiments of user interfaces ("UI") and associated processes that may be implemented on an electronic device, such as a portable multifunction device (PMD) 100 with a display, a touch-sensitive surface, and optionally one or more sensors to detect intensity of contacts with the touch-sensitive surface, or a device 300 with one or more processors, non-transitory memory, a display, and an input device.

FIGS. 8A-8W illustrate example user interfaces for generating 3D objects in accordance with some embodiments. The user interfaces in these figures are used to illustrate the processes described below, including the processes in FIG. 9. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 8A illustrates a CGR environment user interface 801 displayed by a portable multifunctional device 100 (hereinafter "device 100").

In FIG. 8A, the CGR environment user interface 801 includes a toolbar region 801A and a display region 801B displaying a CGR environment. The toolbar region 801A includes an object addition affordance 801AA for adding a CGR object to the CGR environment. The display region 801B includes a scene camera image taken by the device 100 of a physical environment (e.g., using a scene camera or a camera disposed on an opposite side of the device 100 than illustrated in FIG. 8A). The physical environment includes, among other things, a side wall, a back wall, a floor, and a table. Accordingly, the scene camera image includes a representation of the side wall 801BA, a representation of the back wall 801BB, a representation of the floor 801BC, and a representation of the table 801BD.

FIG. 8A illustrates a user input 899A directed to the object addition affordance 801AA. In various embodiments, the user input 899A corresponds to a contact (e.g., a tap) detected at the location of the object addition affordance 801AA.

Figure 8B:
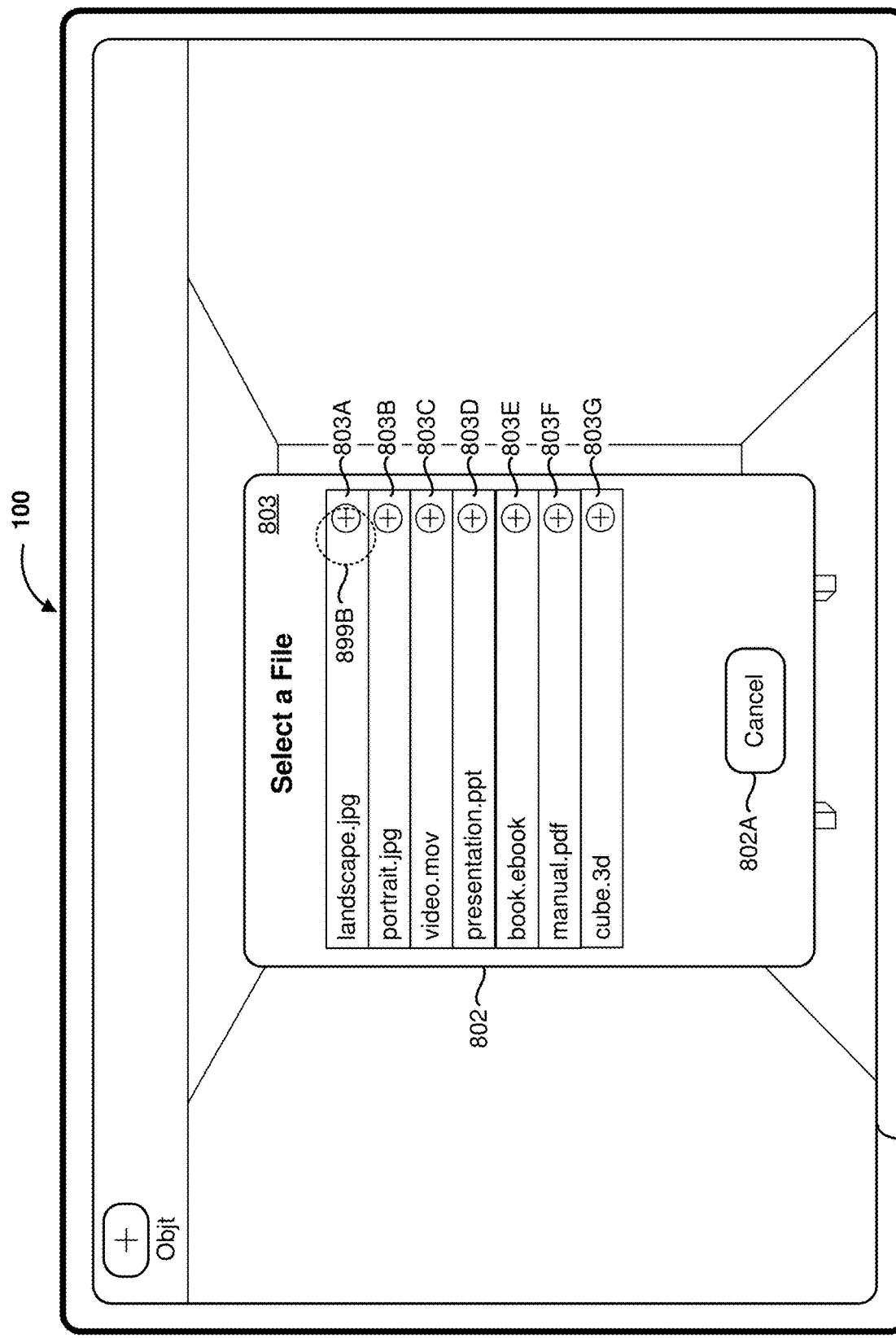

FIG. 8B illustrates the CGR environment user interface 801 in response to detecting the user input 899A directed to the object addition affordance 801AA. In FIG. 8B, the CGR environment user interface 801 includes an object addition user interface 802 in the form of a pop-up window. In FIG. 8B, the object addition user interface 802 includes a file selection user interface 803 and a cancel affordance 802A for dismissing (ceasing to display) the object addition user interface 802 without adding a CGR object to the CGR environment.

The file selection user interface 803 includes a plurality of file selection affordances 803A-803G respectively associated with a plurality of files. The plurality of file selection affordances 803A-803G includes a first file selection affordance 803A for selecting a first image file named "landscape.jpg", a second file selection affordance 803B for selecting a second image file named "portrait.jpg", e.g., an image with depth information, a third file selection affordance 803C for selecting a video file named "video.mov", a fourth file selection affordance 803D for selecting a presentation file named "presentation.ppt", a fifth file selection affordance 803E for selecting an electronic book file named "book.ebook", a sixth file selection affordance 802F for selecting a PDF (Portable Document Format) file named "manual.pdf", and a seventh file selection affordance 802G for selecting a three-dimensional (3D) object file named "cube.3d", FIG. 8B illustrates a user input 899B directed to the first file selection affordance 803A. In various embodiments, the user input 899B corresponds to a contact (e.g., a tap) detected at the location of the first file selection affordance 803A.

Figure 8C:
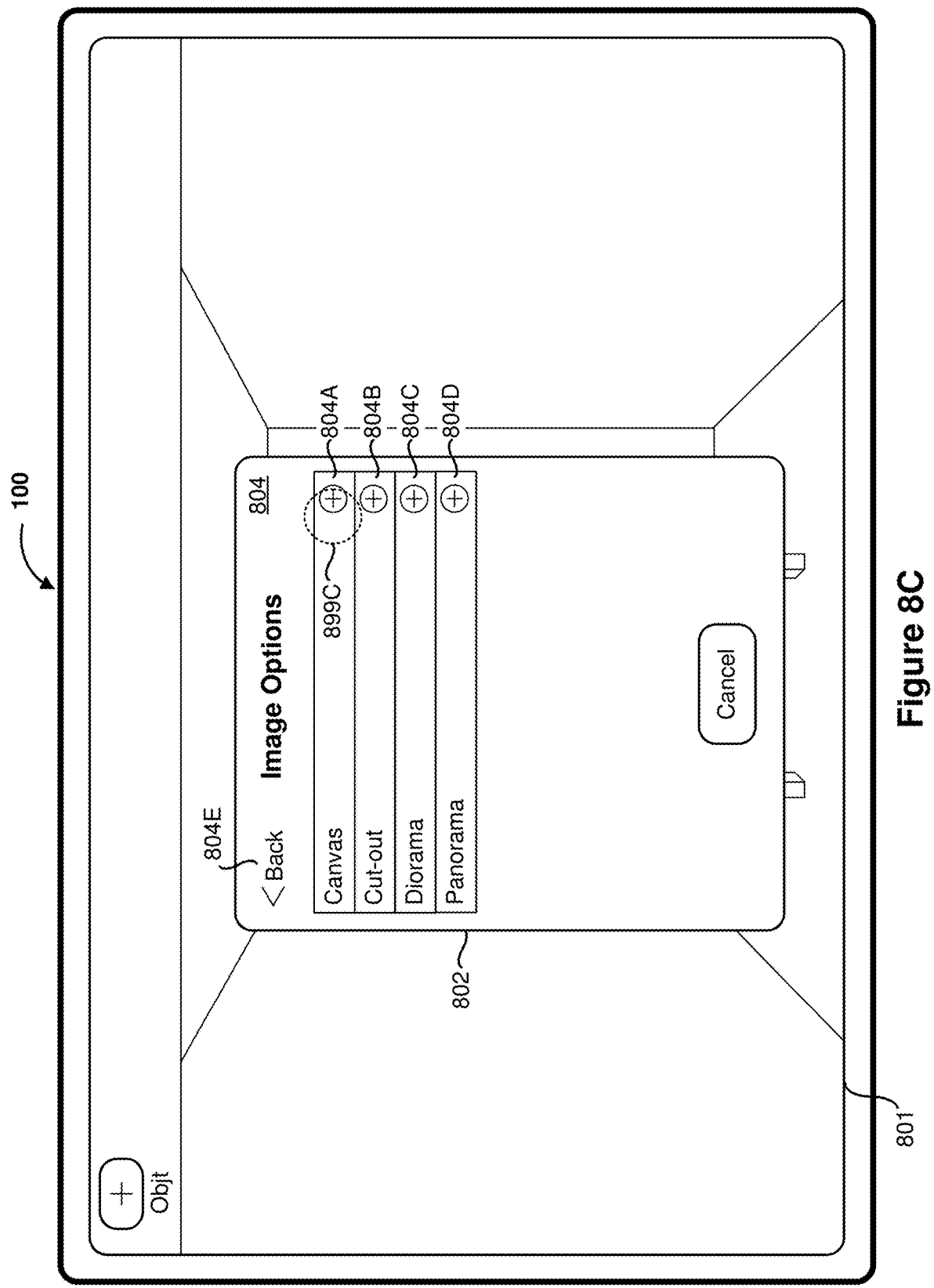

FIG. 8C illustrates the CGR environment user interface 801 in response to detecting the user input 899B directed to the first file selection affordance 803A. In FIG. 8C, based on the file type (e.g., an image file) of the selected file (e.g., "landscape.jpg"), the object addition user interface 802 includes an image options user interface 804. The image options user interface 804 includes a plurality of image option selection affordances 804A-804D for selecting an option for generating a 3D object based on the selected image file.

The plurality of image option selection affordances 804A-804D includes a canvas affordance 804A for generating a canvas 3D object based on the selected image file, a cut-out affordance 804B for generating a cut-out 3D object based on the selected image file, a diorama affordance 804C for generating a diorama 3D object based on the selected image file, and a panorama affordance 804D for generating a panorama 3D object based on the selected image file.

The image options user interface 804 includes a back affordance 804E for returning the object addition user interface 802 to display of the file selection user interface 803 (e.g., as illustrated in FIG. 8B). Accordingly, in response to detecting a user input directed to the back affordance 804E, the image options user interface 804 is replaced with the file selection user interface 803.

FIG. 8C illustrates a user input 899C directed to the canvas affordance 804A. In various embodiments, the user input 899C corresponds to a contact (e.g., a tap) detected at the location of the canvas affordance 804A.

Figure 8D:
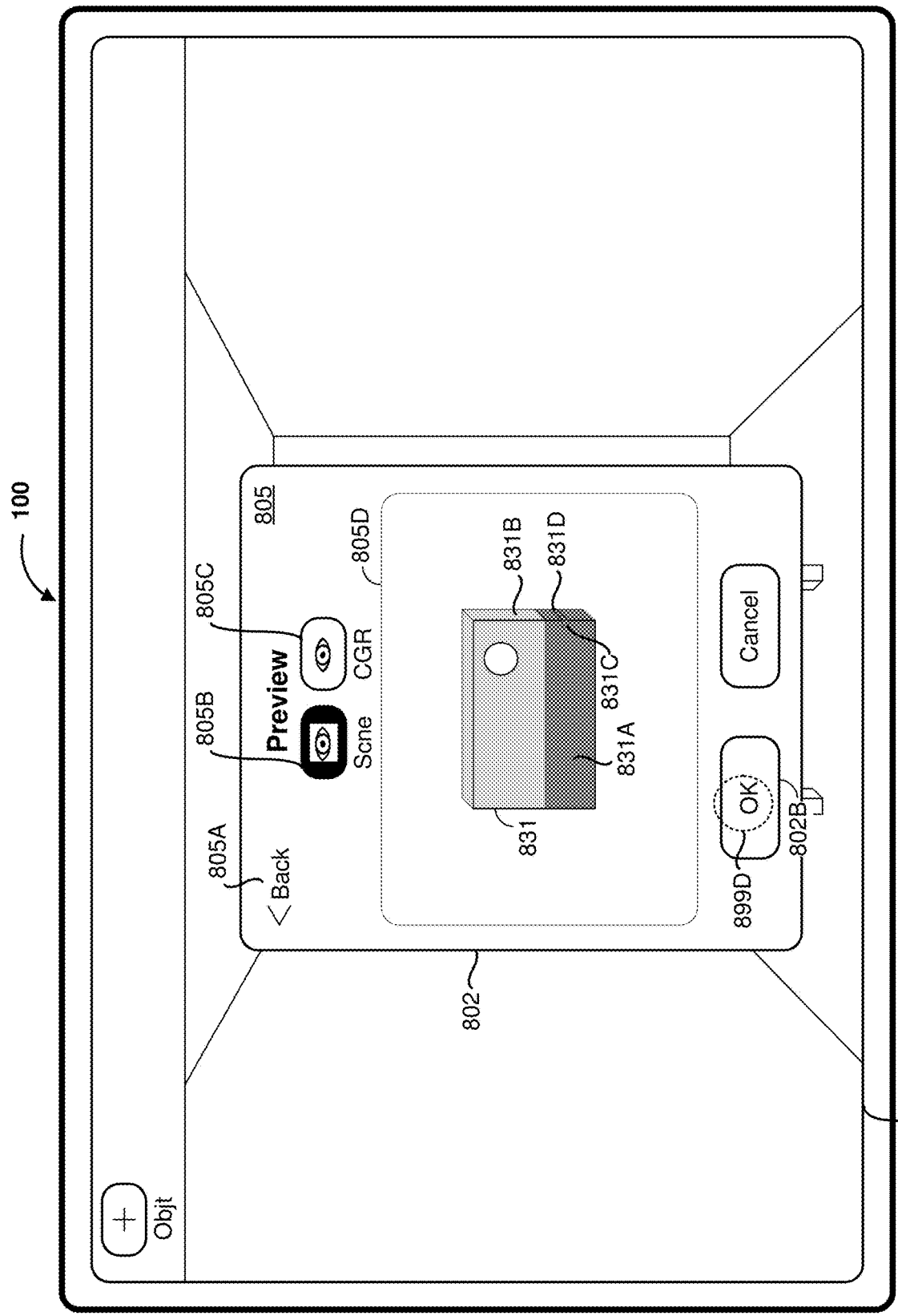

FIG. 8D illustrates the CGR environment user interface 801 in response to detecting the user input 899C directed to the canvas affordance 804A. In FIG. 8D, the object addition user interface 802 includes a preview user interface 805.

The preview user interface 805 includes a back affordance 805A for returning the object addition user interface 802 to display of the image options user interface 804 (or whichever options user interface was most recently displayed). Accordingly, in response to detecting a user input directed to the back affordance 805A, the preview user interface 805 is replaced with the image options user interface 804 (or whichever options user interface was most recently displayed).

The preview user interface 805 includes a view window 805D presenting a representation of a canvas 3D object 831 based on the selected image file. The selected image file represents an image including a plurality of pixels at respective pixel locations and having respective pixel values.

The canvas 3D object is defined by a wireframe (or display mesh) and one or more texture images. The wireframe includes a front face, one or more edge faces, and a back face. The front face has the shape of the image represented by the selected image file (e.g., a rectangle). The front face is associated with a front face texture image corresponding to the image represented by the selected image file. Accordingly, the representation of the canvas 3D object 831 includes a front face 831A displaying the image represented by the selected image file. The back face is the same shape as the front face spaced apart from the front face in a direction perpendicular to the front face. In various embodiments, the back face is associated with a back face texture image corresponding to the image represented by the selected image file. In various embodiments, the back face is associated with a back face texture image corresponding to a different image (e.g., an image of the back of a canvas, a standard plain texture, or a different version of the image represented by the selected image file, e.g., mirrored or blurred).

The one or more edge faces connect the front face to the back face. The one or more edge faces are associated with one or more edge face texture images corresponding to a stretching of the pixels on the edge of the image represented by the selected image file. Accordingly, the representation of the canvas 3D object 831 includes an edge face 831B. Each pixel on the edge of the image represented by the selected image file corresponds to a pixel on the edge of the front face texture image and a line of pixels of an edge face texture image connecting the front face to the back face. For example, a first edge pixel 831C of the front face 831A has a first pixel value (e.g., dark gray) which corresponds to a set of pixels 831D of the edge face 831B having the same pixel value.

The preview user interface 805 includes a plurality of view affordances 805B-805C including an object view affordance 805B for viewing the canvas 3D object 831 in the view window 805D in a scene mode (in which the user inputs directed to the view window 805D change the perspective of the view of the canvas 3D object 831) and a CGR view affordance 805C for viewing the canvas 3D object 831 in the view window 805D in a CGR mode (in which movement of the device 100 changes the perspective of the view of the canvas 3D object 831).

The object addition user interface 802 includes an OK affordance 802B for adding the canvas 3D object to the CGR environment and dismissing (ceasing the display) the object addition user interface 802.

FIG. 8D illustrates a user input 899D directed to the OK affordance 802B. In various embodiments, the user input 899D corresponds to a contact (e.g., a tap) detected at the location of the OK affordance 802B.

Figure 8E:
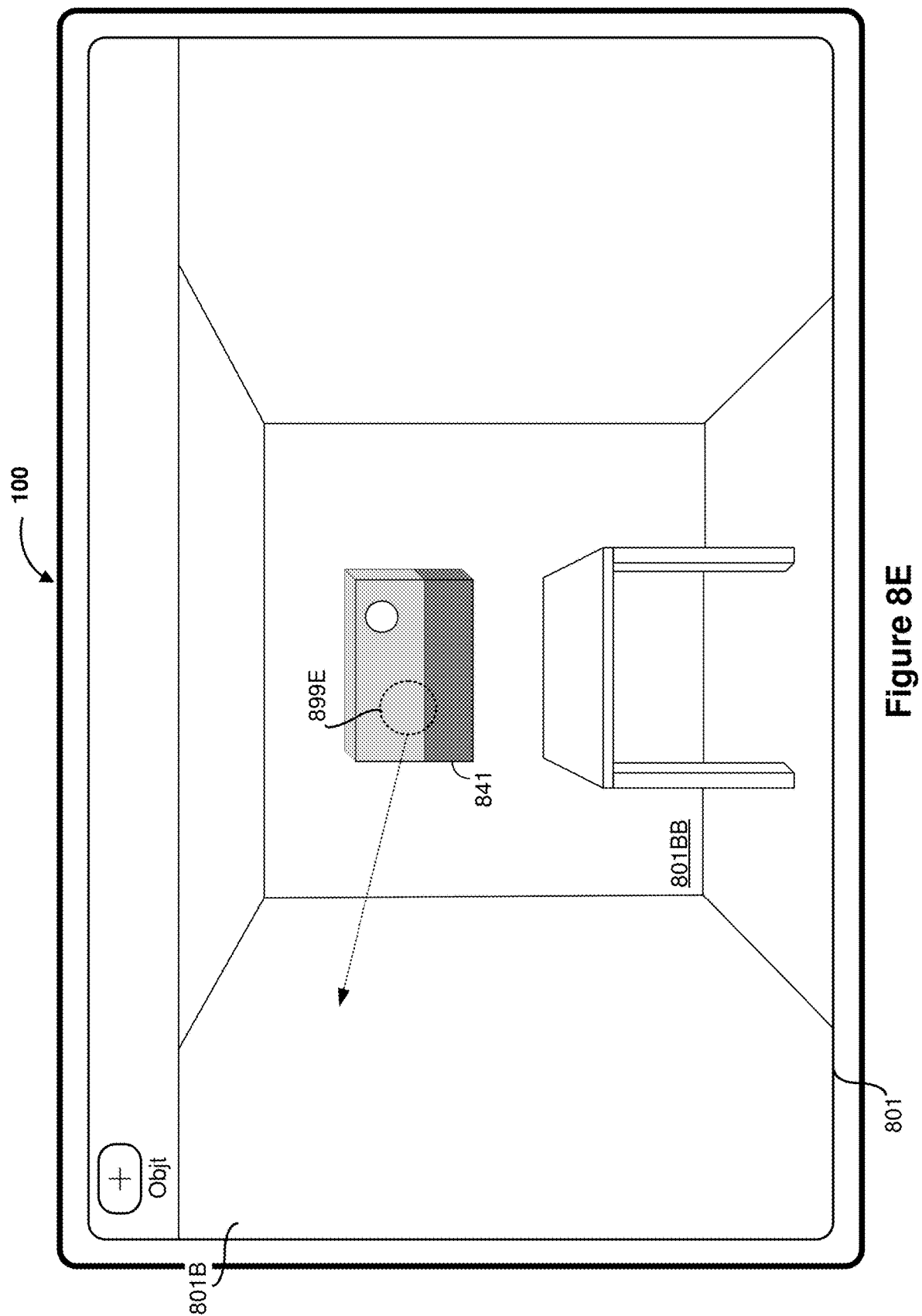

FIG. 8E illustrates the CGR environment user interface 801 in response to detecting the user input 899D directed to the OK affordance 802B. In FIG. 8E, the display region 801B includes a representation of the canvas 3D object 841 displayed against the representation of the back wall 801BB. In various implementations, the device 100 detects a vertical plane corresponding to the back wall and displays the representation of the canvas 3D object 841 displayed against the representation of the back wall 801BB in response to detecting the vertical plane.

FIG. 8E illustrates a user input 899E directed to the representation of the canvas 3D object 841. In various embodiments, the user input 899E corresponds to a moving contact (e.g., a drag or touch-and-drag) detected with a start location at the location of the representation of the canvas 3D object 841.

Figure 8F:
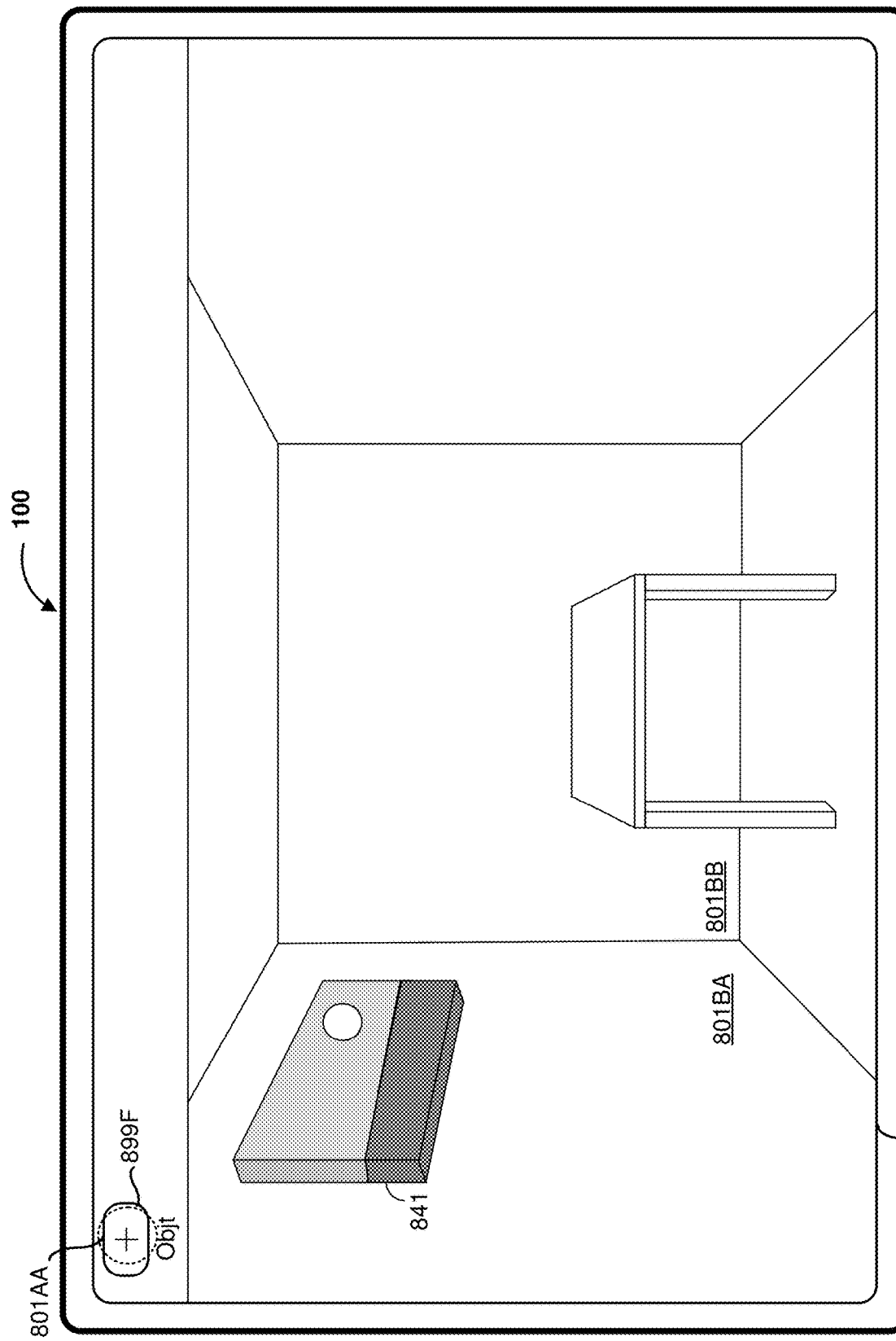

FIG. 8F illustrates the CGR environment user interface 801 in response to detecting the user input 899E directed to the representation of the canvas 3D object 841. In FIG. 8F, the representation of the canvas 3D object 841 is moved, displayed against the representation of the side wall 801BA rather than the representation of the back wall 801BB. In various implementations, the device 100 detects a vertical plane corresponding to the side wall and displays the representation of the canvas 3D object 841 displayed against the representation of the side wall 801BB in response to detecting the vertical plane and the user input 899E.

FIG. 8F illustrates a user input 899F directed to the object addition affordance 801AA. In various embodiments, the user input 899F corresponds to a contact (e.g., a tap) detected at the location of the object addition affordance 801AA.

Figure 8G:
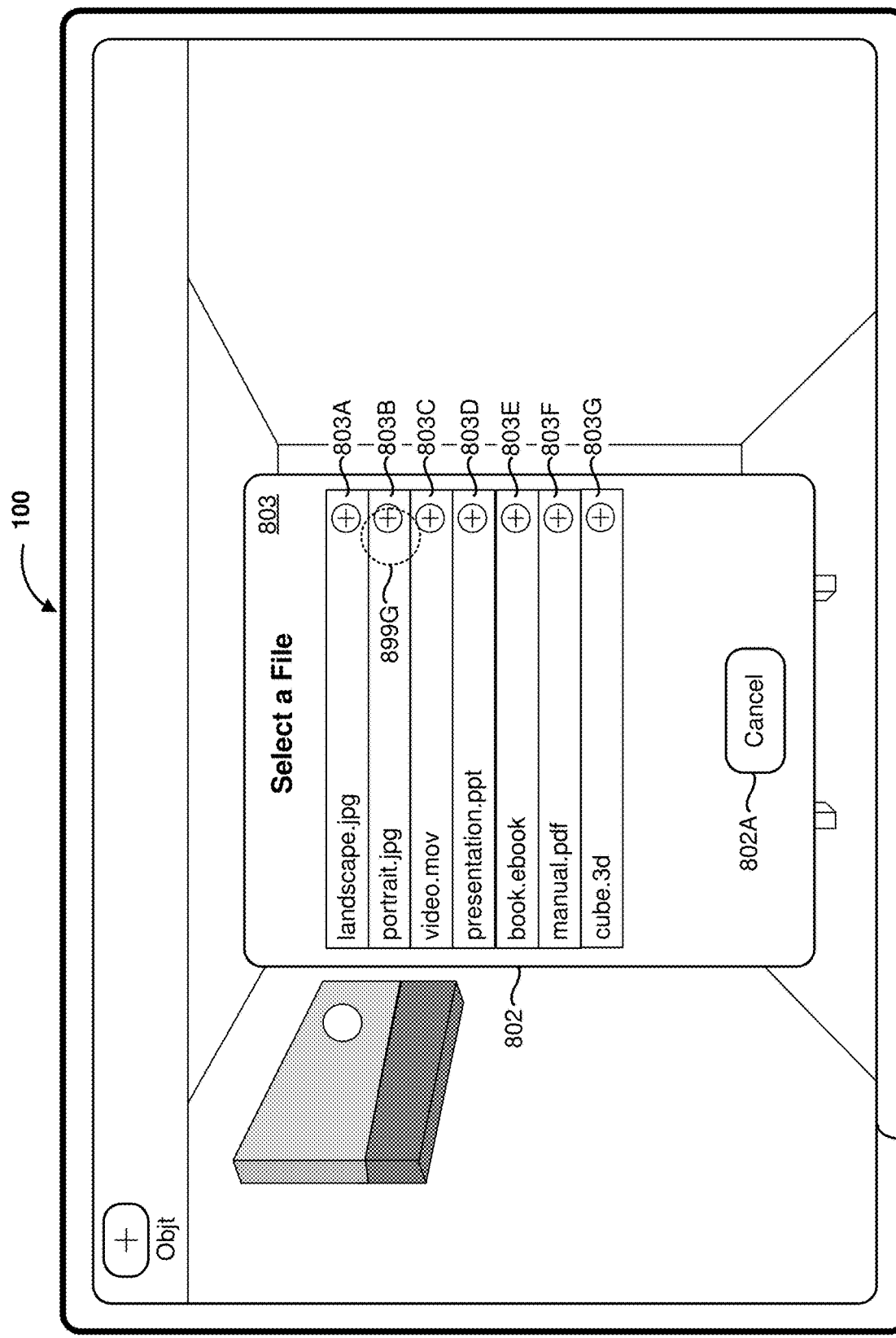

FIG. 8G illustrates the CGR environment user interface 801 in response to detecting the user input 899F directed to the object addition affordance 801AA. In FIG. 8G, the CGR environment user interface 801 includes the object addition user interface 802 in the form of a pop-up window. In FIG. 8G, the object addition user interface 802 includes the file selection user interface 803 and the cancel affordance 802A. The file selection user interface 803 includes the plurality of file selection affordances 803A-803G.

FIG. 8G illustrates a user input 899G directed to the second file selection affordance 803B. In various embodiments, the user input 899G corresponds to a contact (e.g., a tap) detected at the location of the second file selection affordance 803B.

Figure 8H:
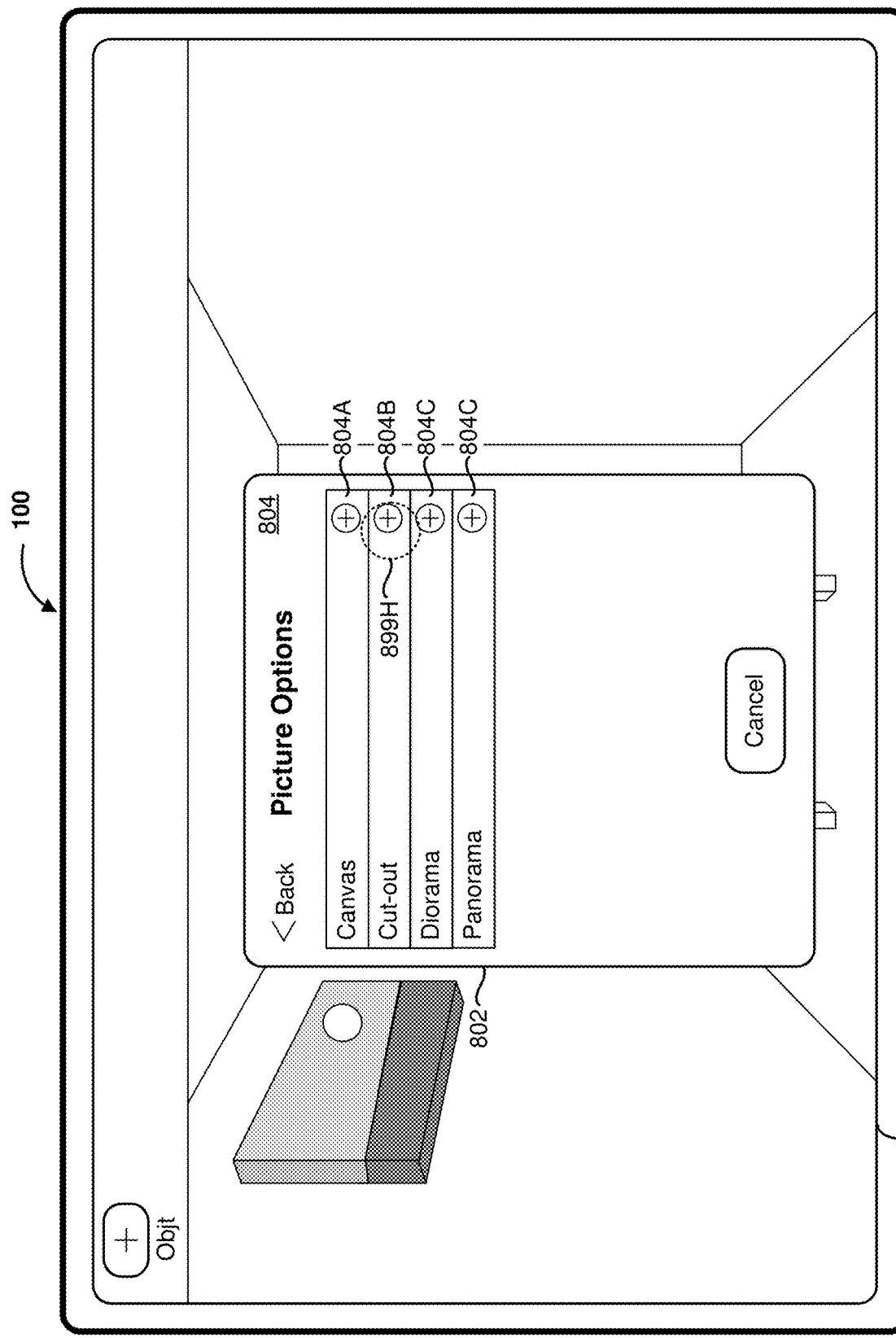

FIG. 8H illustrates the CGR environment user interface 801 in response to detecting the user input 899G directed to the second file selection affordance 803B. In FIG. 8H, based on the file type (e.g., an image file) of the selected file (e.g., "portrait.jpg"), the object addition user interface 802 includes the image options user interface 804 including the plurality of image option selection affordances 804A-804D.

FIG. 8H illustrates a user input 899H directed to the cut-out affordance 804B. In various embodiments, the user input 899H corresponds to a contact (e.g., a tap) detected at the location of the cut-out affordance 804B.

Figure 8I:
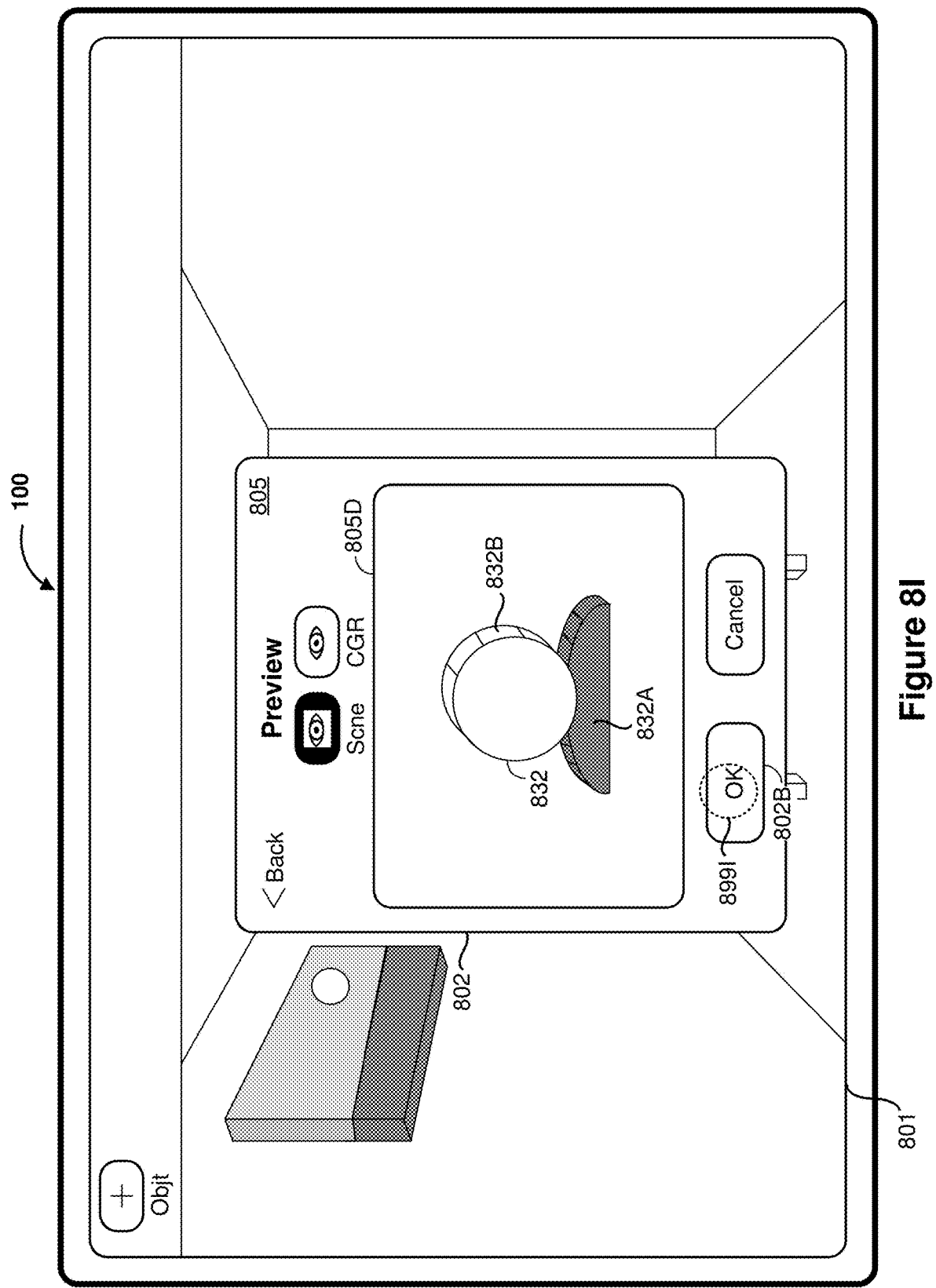

FIG. 8I illustrates the CGR environment user interface 801 in response to detecting the user input 899H directed to the cut-out affordance 804A. In FIG. 8I, the object addition user interface 802 includes the preview user interface 805.

The preview user interface 805 includes the view window 805D presenting a representation of a cut-out 3D object 832 based on the selected image file. The selected image file represents an image including a plurality of pixels at respective pixel locations and having respective pixel values. The image includes a foreground and a background. In various embodiments, the device 100 performs semantic segmentation to determine the foreground and background. In various embodiments, the image file includes information (e.g., a depth map) defining the foreground and background.

The cut-out 3D object is defined by a wireframe (or display mesh) and one or more texture images. The wireframe includes a front face, one or more edge faces, and a back face. The front face has the shape of the foreground of the image represented by the selected image file (e.g., a portrait). The front face is associated with a front face texture image corresponding to foreground of the image represented by the selected image file. Accordingly, the representation of the cut-out 3D object 832 includes a front face 832A displaying the foreground of the image represented by the selected image file. The back face is the same shape as the front face spaced apart from the front face in a direction perpendicular to the front face. In various embodiments, the back face is associated with a back face texture image corresponding to the foreground of the image represented by the selected image file. In various embodiments, the back face is associated with a back face texture image corresponding to a different image (e.g., an image of cardboard).

The one or more edge faces connect the front face to the back face. The one or more edge faces are associated one or more edge face texture images corresponding to a stretching of the pixels on the edge of the foreground of the image represented by the selected image file. Accordingly, the representation of the cut-out 3D object 832 includes an edge face 832B. Each pixel on the edge of the image represented by the selected image file corresponds to a pixel on the edge of the front face texture image and a line of pixels of an edge face texture image connecting the front face to the back face.

FIG. 8I illustrates a user input 899I directed to the OK affordance 802B. In various embodiments, the user input 899I corresponds to a contact (e.g., a tap) detected at the location of the OK affordance 802B.

Figure 8J:
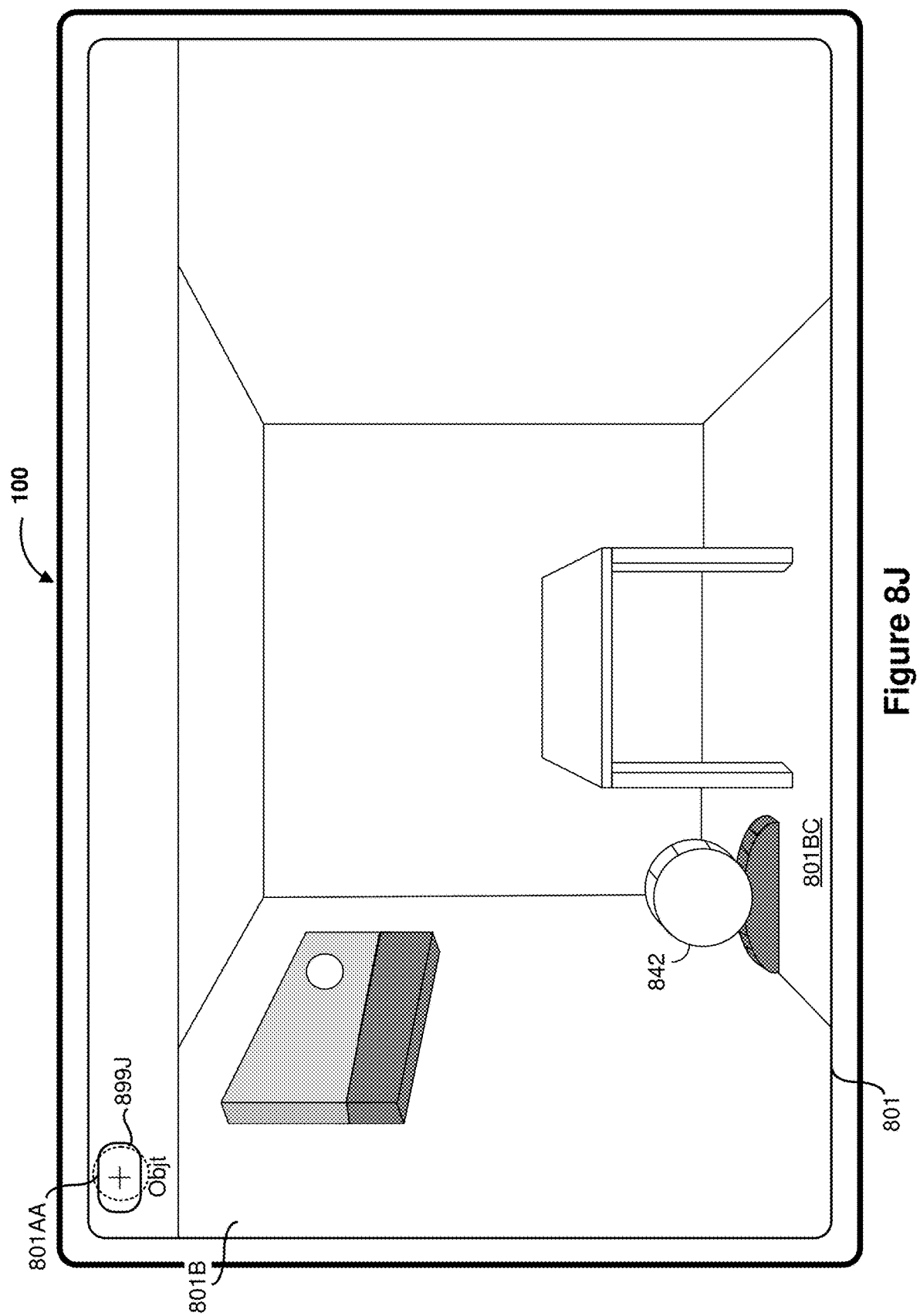

FIG. 8J illustrates the CGR environment user interface 801 in response to detecting the user input 899I directed to the OK affordance 802B. In FIG. 8J, the display region 801B includes a representation of the cut-out 3D object 842 displayed on the representation of the floor 801BC.

FIG. 8J illustrates a user input 899J directed to the object addition affordance 801AA. In various embodiments, the user input 899J corresponds to a contact (e.g., a tap) detected at the location of the object addition affordance 801AA.

Figure 8K:
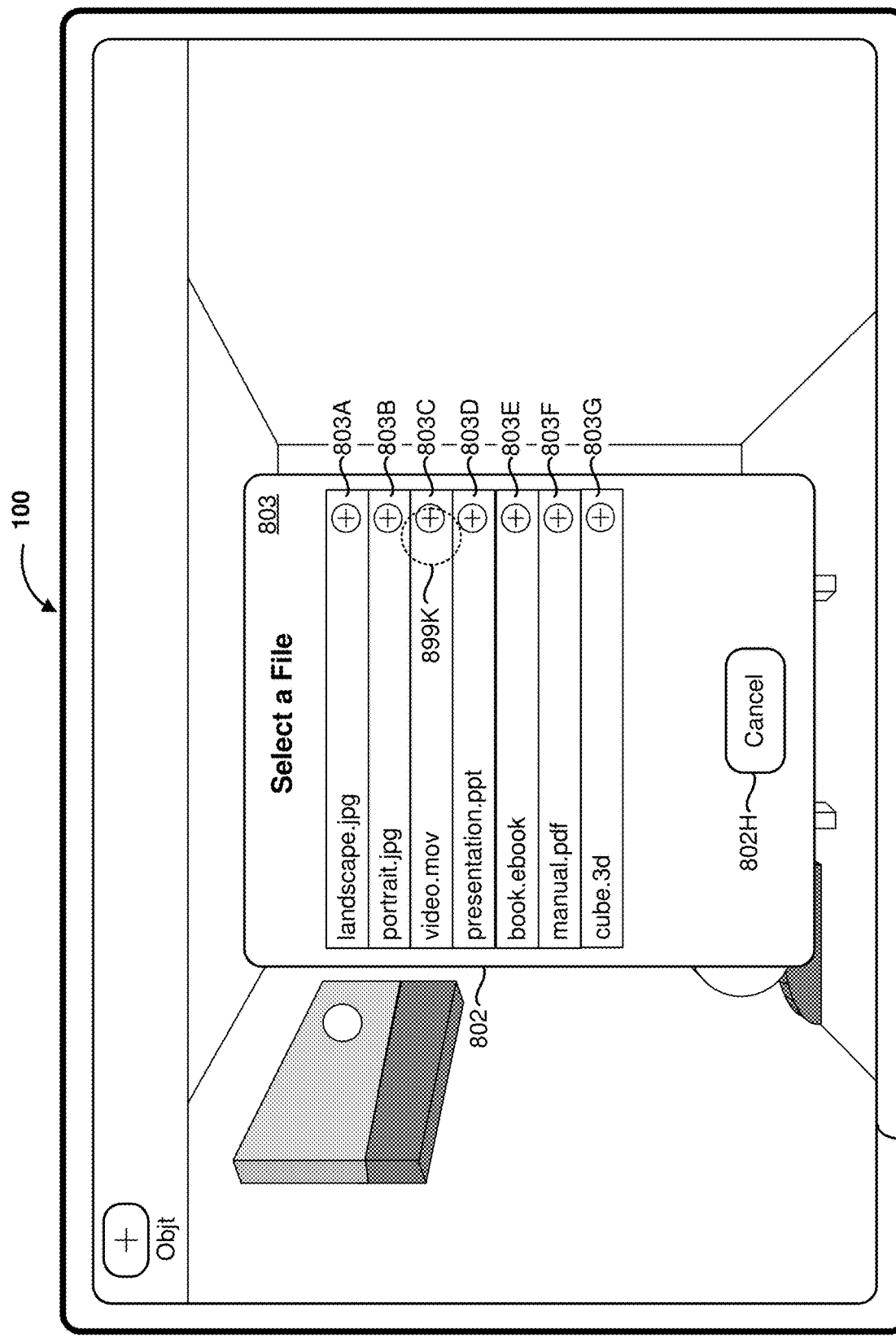

FIG. 8K illustrates the CGR environment user interface 801 in response to detecting the user input 899J directed to the object addition affordance 801AA. In FIG. 8K, the CGR environment user interface 801 includes the object addition user interface 802 in the form of a pop-up window. In FIG. 8K, the object addition user interface 802 includes the file selection user interface 803 and the cancel affordance 802A. The file selection user interface 803 includes the plurality of file selection affordances 803A-803G.

FIG. 8K illustrates a user input 899K directed to the third file selection affordance 803C. In various embodiments, the user input 899K corresponds to a contact (e.g., a tap) detected at the location of the third file selection affordance 803C.

Figure 8L:
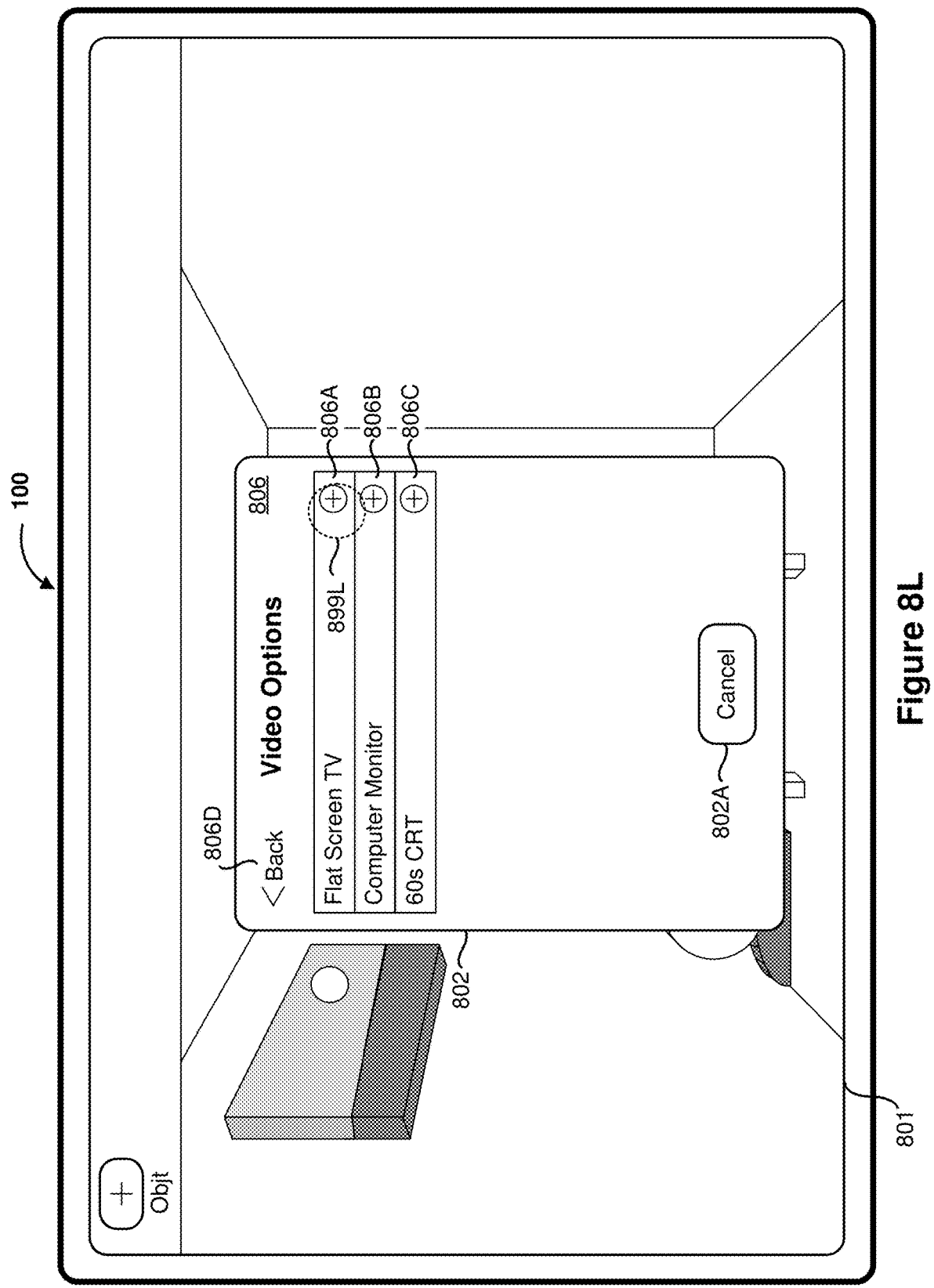

FIG. 8L illustrates the CGR environment user interface 801 in response to detecting the user input 899K directed to the third file selection affordance 803C. In FIG. 8L, based on the file type (e.g., a video file) of the selected file (e.g., "video.mov"), the object addition user interface 802 includes a video options user interface 806. The video options user interface 806 includes a plurality of image option selection affordances 806A-806D for selecting an option for generating a 3D object based on the selected video file.

The plurality of video option selection affordances 806A-806C includes a flat screen TV affordance 806A for generating a flat screen TV 3D object based on the selected video file, a computer monitor affordance 806B for generating a computer monitor 3D object based on the selected video file, and a 60s CRT affordance 806C for generating a 60s CRT 3D object based on the selected video file.

The video options user interface 806 includes a back affordance 806D for returning the object addition user interface 802 to display of the file selection user interface 803 (e.g., as illustrated in FIG. 8K). Accordingly, in response to detecting a user input directed to the back affordance 806D, the video options user interface 806 is replaced with the file selection user interface 803.

FIG. 8L illustrates a user input 899L directed to the flat screen TV affordance 806A. In various embodiments, the user input 899L corresponds to a contact (e.g., a tap) detected at the location of the flat screen TV affordance 806A.

Figure 8M:
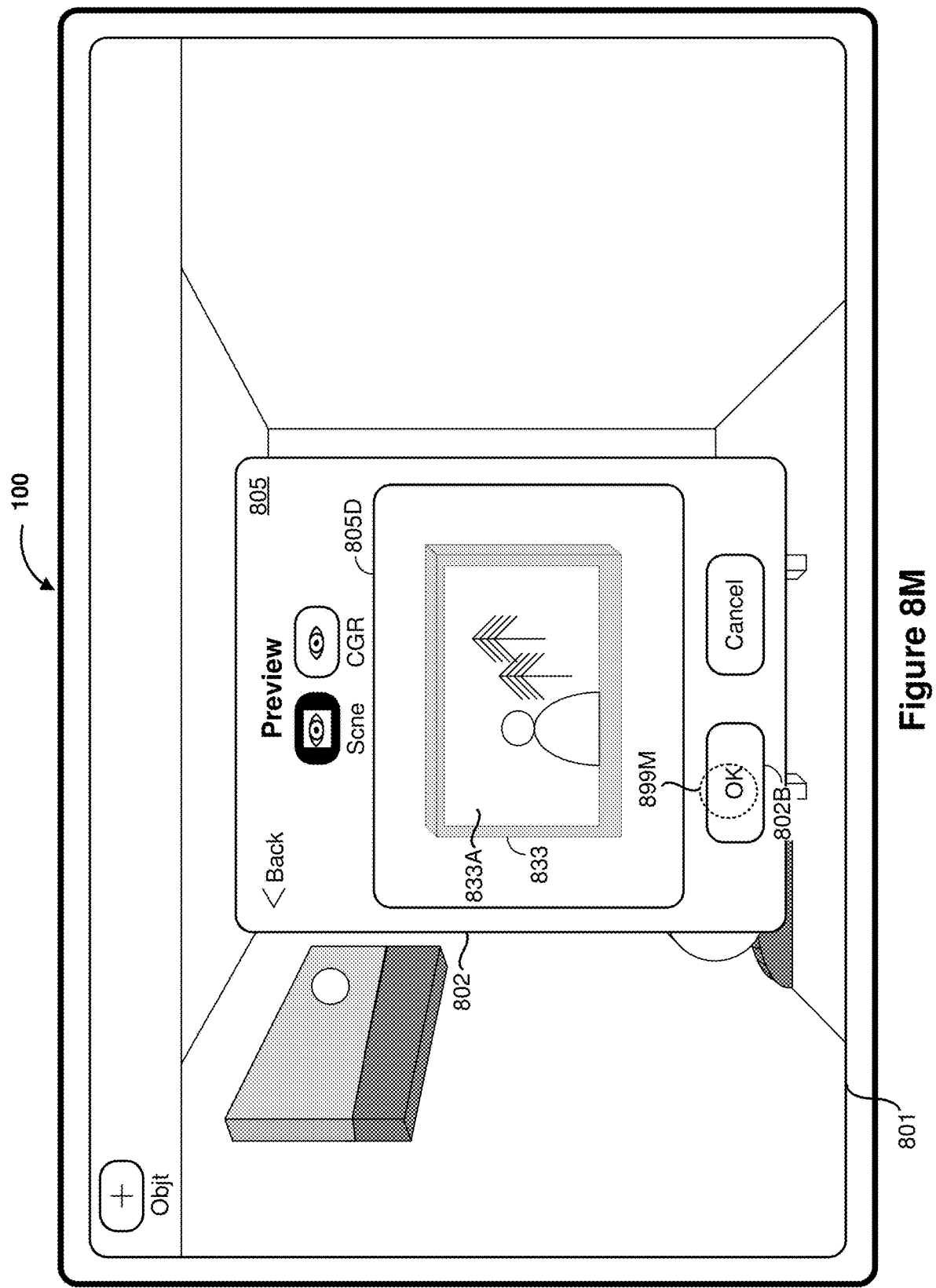

FIG. 8M illustrates the CGR environment user interface 801 in response to detecting the user input 899L directed to the flat screen TV affordance 806A. In FIG. 8M, the object addition user interface 802 includes the preview user interface 805.

The preview user interface 805 includes the view window 805D presenting a representation of a flat screen TV 3D object 833 based on the selected video file. The selected video file represents a video including a sequence of images.

The flat screen TV 3D object is defined by a wireframe (or display mesh) and one or more texture images. The wireframe includes a front face, one or more edge faces, and a back face. The front face has a generally rectangular shape. The front face is associated with a front face texture image corresponding to the front of a flat screen TV with a display region including an image in the sequence of images of the video. Accordingly, the representation of the flat screen TV 3D object 833 includes a front face including a display region 833A displaying an image in the sequence of images of the video. At different times, different images of the sequence of images are displayed in order. Thus, the display region 833A displays the video represented by the video file. The back face and the one or more edge faces are shaped such that the wireframe generally has the shape of a flat screen TV. The back face and the one or more edge faces are associated with respective texture images corresponding to the back and one or more edges of a flat screen TV.

FIG. 8M illustrates a user input 899M directed to the OK affordance 802B. In various embodiments, the user input 899M corresponds to a contact (e.g., a tap) detected at the location of the OK affordance 802B.

Figure 8N:
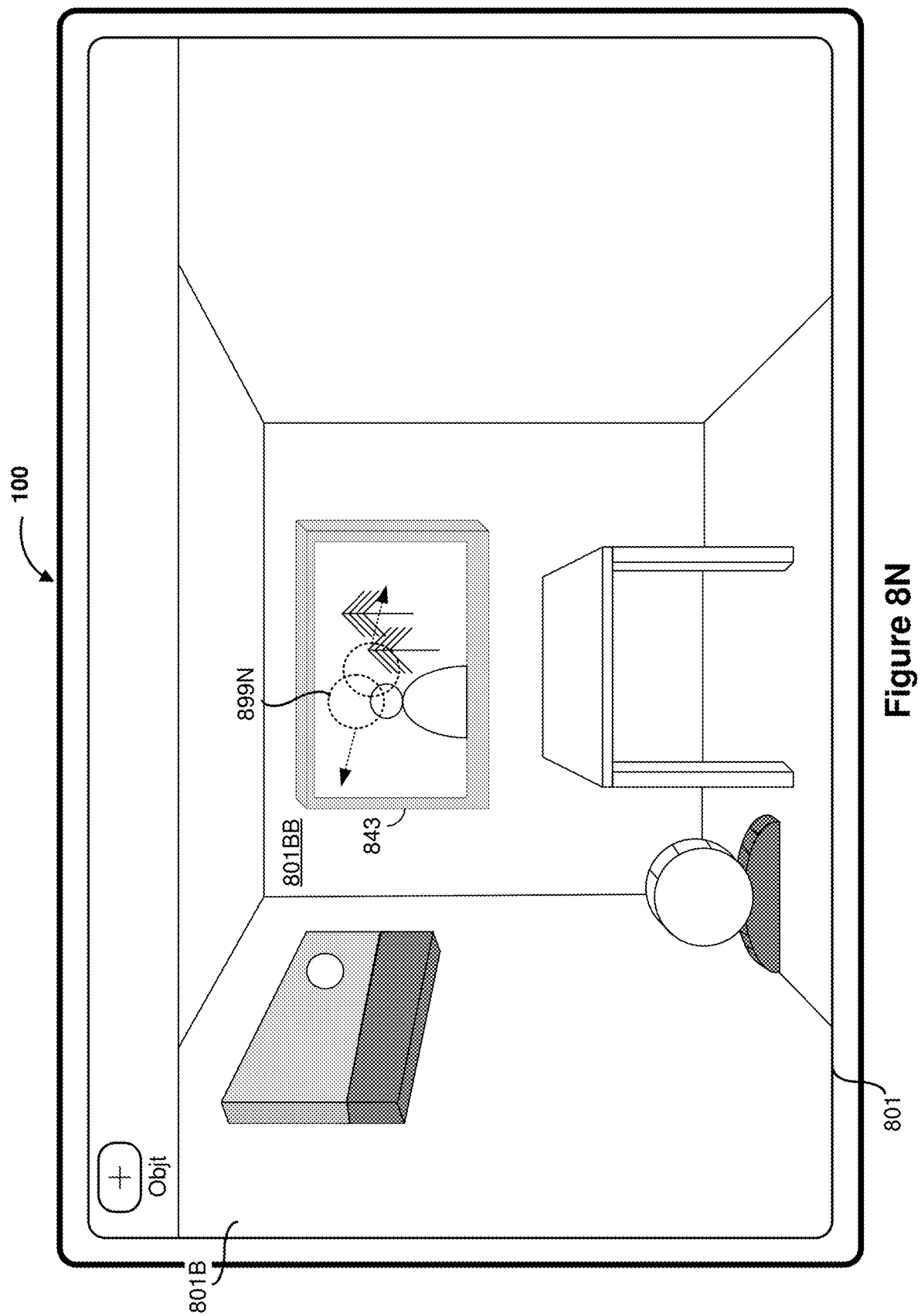

FIG. 8N illustrates the CGR environment user interface 801 in response to detecting the user input 899M directed to the OK affordance 802B. In FIG. 8N, the display region 801B includes a representation of the flat screen TV 3D object 843 displayed against the representation of the back wall 801BB.

FIG. 8N illustrates a user input 899N directed to the representation of the flat screen 3D object 843. In various embodiments, the user input 899N corresponds to two contacts moving closer to or further away from each other (e.g., a pinch or de-pinch gesture) detected at the location of the representation of the flat screen TV CGR object 843.

Figure 8O:
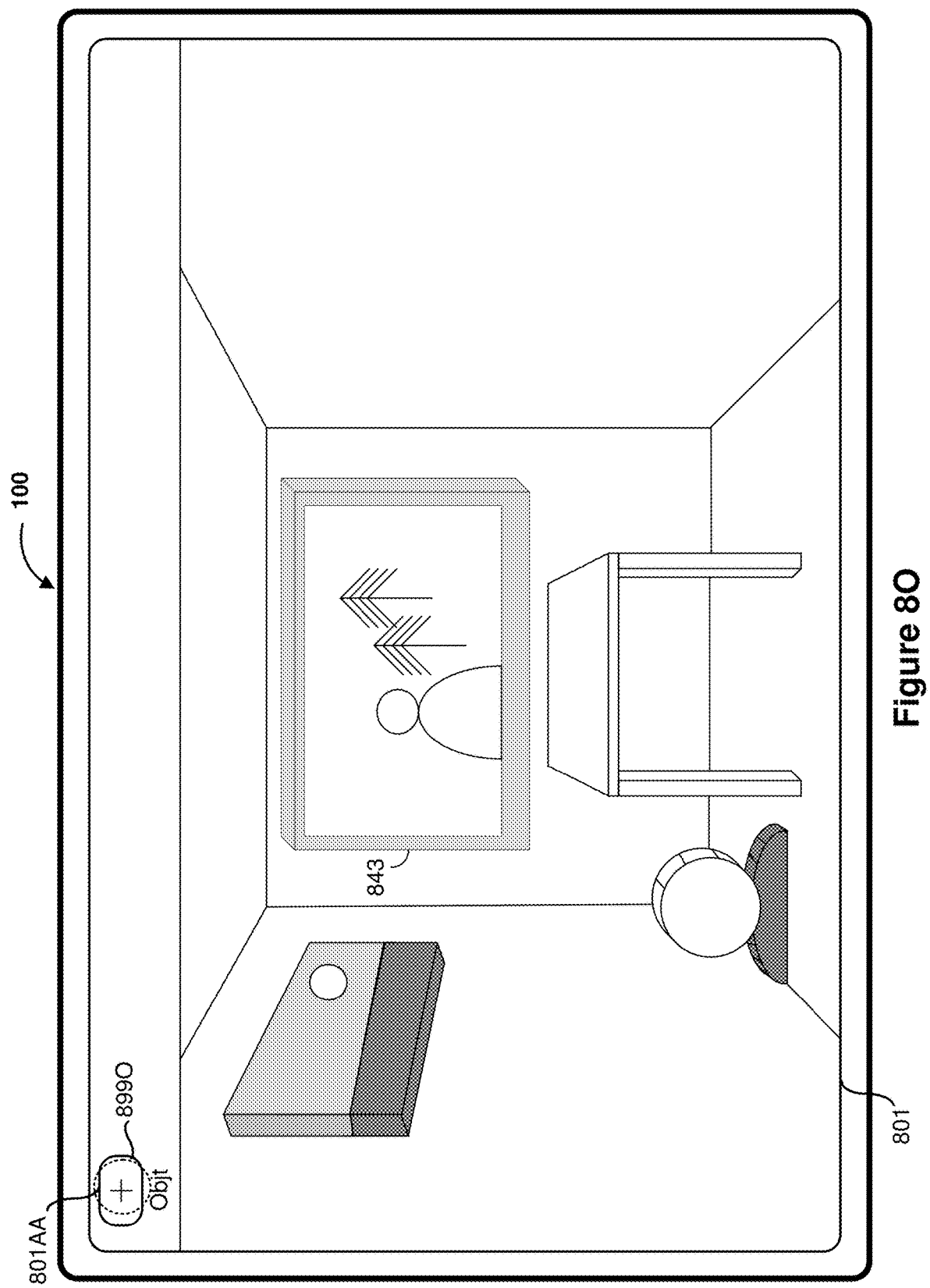

FIG. 8O illustrates the CGR environment user interface 801 in response to detecting the user input 899N directed to the representation of the flat screen TV 3D object 843. In FIG. 8O, the representation of the flat screen TV 3D object 843 is resized, made bigger by the user input 899N.

FIG. 8O illustrates a user input 899O directed to the object addition affordance 801AA. In various embodiments, the user input 899O corresponds to a contact (e.g., a tap) detected at the location of the object addition affordance 801AA.

Figure 8P:
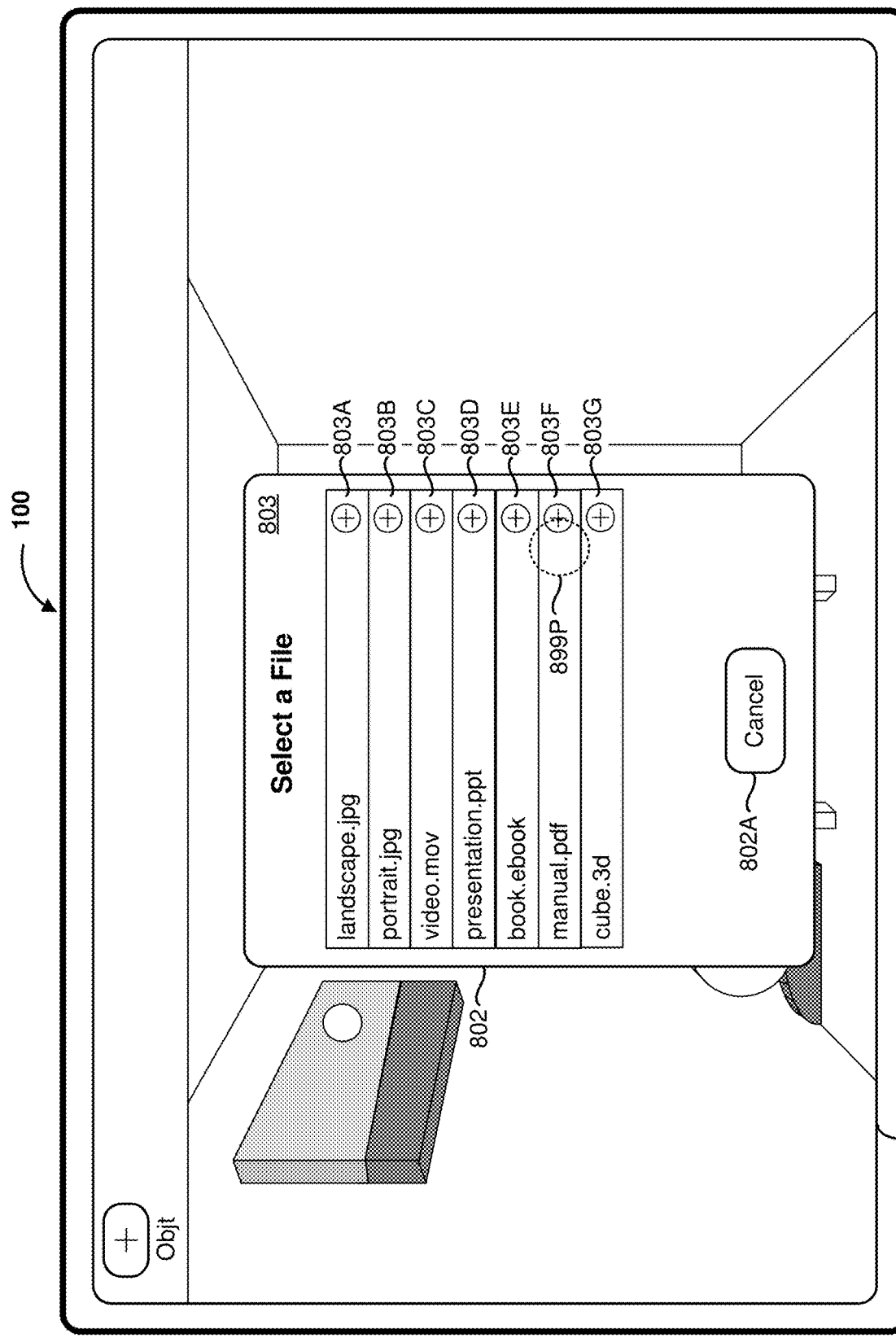

FIG. 8P illustrates the CGR environment user interface 801 in response to detecting the user input 899O directed to the object addition affordance 801AA. In FIG. 8P, the CGR environment user interface 801 includes the object addition user interface 802 in the form of a pop-up window. In FIG.

8P, the object addition user interface 802 includes the file selection user interface 803 and the cancel affordance 802A. The file selection user interface 803 includes the plurality of file selection affordances 803A-803G.

FIG. 8P illustrates a user input 899P directed to the sixth file selection affordance 803F. In various embodiments, the user input 899P corresponds to a contact (e.g., a tap) detected at the location of the sixth file selection affordance 803F.

Figure 8Q:
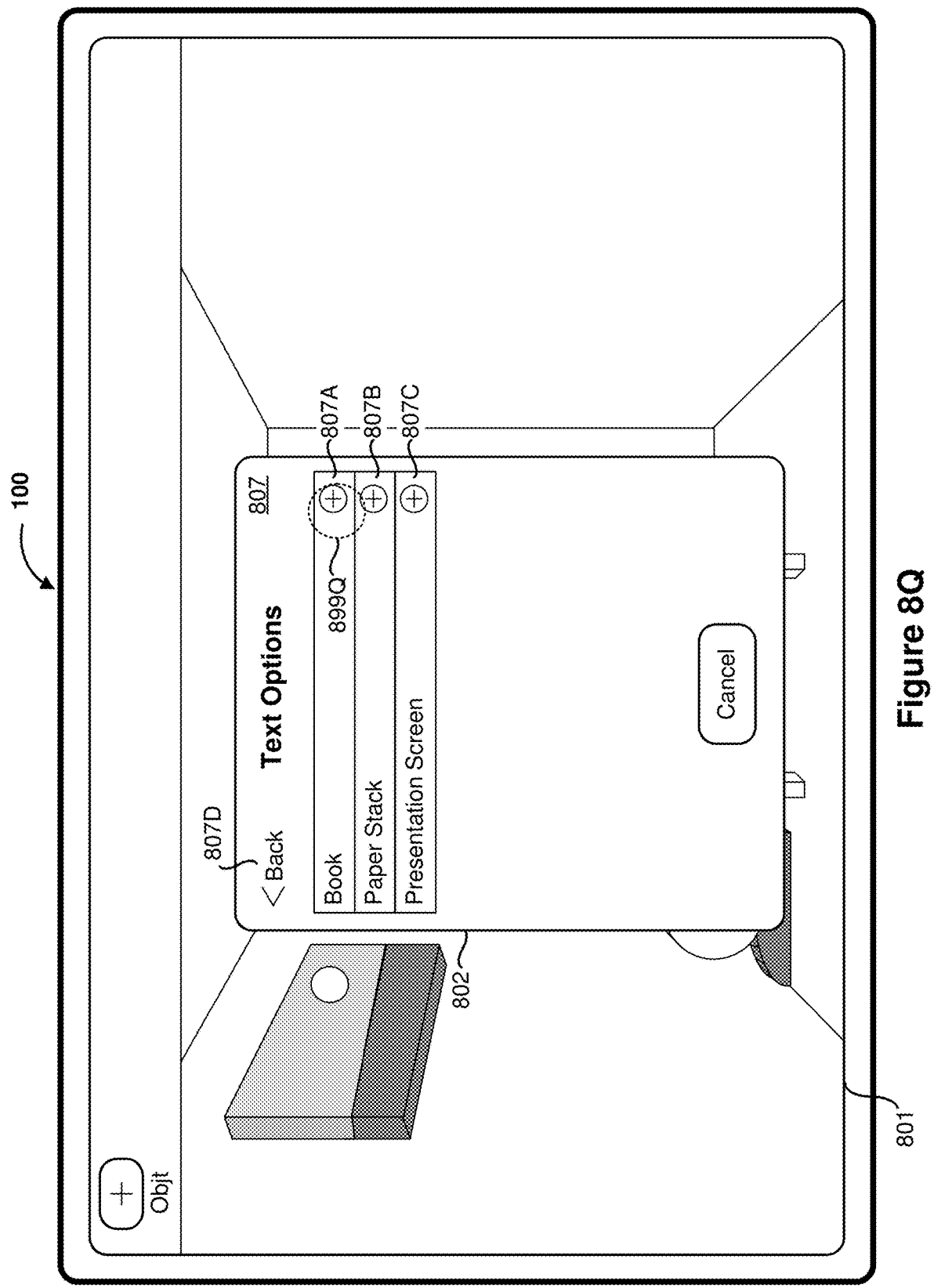

FIG. 8Q illustrates the CGR environment user interface 801 in response to detecting the user input 899P directed to the sixth file selection affordance 803F. In FIG. 8Q, based on the file type (e.g., a text file) of the selected file (e.g., "manual.pdf"), the object addition user interface 802 includes a text options user interface 806 including a plurality of text option selection affordances 807A-807C for selecting an option for generating a 3D object based on the selected text file. In various embodiments, a text file can include a PDF file, a word processing file, or an ebook file. Accordingly, in various embodiments, the text file can include more than just text, such as images, diagrams, video, or other content. In various embodiments, the text file includes a number of pages (and may, therefore, be referred to as a page file).

The plurality of text option selection affordances 807A-807C includes a book affordance 807A for generating a book 3D object based on the selected text file, a paper stack affordance 807B for generating a paper stack 3D object based on the selected text file, and a presentation screen affordance 807C for generating a presentation screen 3D object based on the selected text file.

The text options user interface 807 includes a back affordance 807D for returning the object addition user interface 802 to display of the file selection user interface 803 (e.g., as illustrated in FIG. 8P). Accordingly, in response to detecting a user input directed to the back affordance 807D, the text options user interface 807 is replaced with the file selection user interface 803.

FIG. 8Q illustrates a user input 899Q directed to the book affordance 807A. In various embodiments, the user input 899Q corresponds to a contact (e.g., a tap) detected at the location of the book affordance 807A.

Figure 8R:
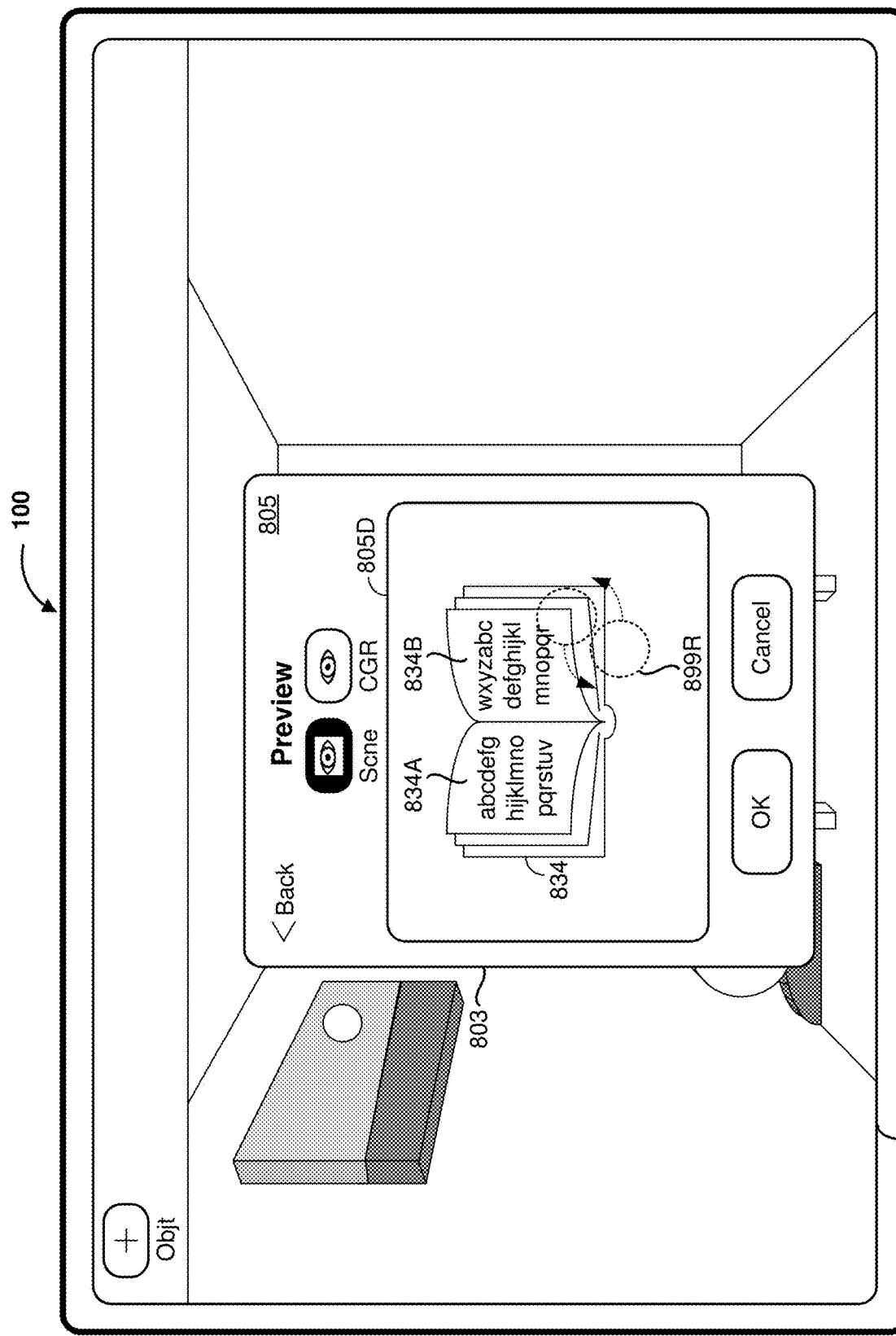

FIG. 8R illustrates the CGR environment user interface 801 in response to detecting the user input 899Q directed to the book affordance 807A. In FIG. 8R, the object addition user interface 802 includes the preview user interface 805.

The preview user interface 805 includes the view window 805D presenting a representation of a book 3D object 834 based on the selected text file. The selected book file represents a plurality of pages, each including text and/or other content.

The book 3D object is defined by a wireframe (or display mesh) and one or more texture images. The wireframe includes generally in the shape of an open book and includes a front face, a spine face, a back face, a left page face, and a right page face. The left page face has a generally rectangular shape. The left page face is associated with a texture image corresponding to a first page of the text file. Accordingly, the representation of the book 3D object 834 includes a left page face 834A displaying the first page of the text file. The right page face has a generally rectangular shape. The right page face is associated with a texture image corresponding to a second page of the text file. Accordingly, the representation of the book 3D object 834 includes a right page face 834B displaying the second page of the text file. In various embodiments, in response to a user input directed to the book 3D object in a CGR environment, the left page face is associated with a texture image corresponding to the third page of the text file and the right page face is associated with a texture image corresponding to the fourth page of the text file. Similarly, in response to a further user input directed to the book 3D object in the CGR environment, the left page face is associated with a texture image corresponding to the fifth page of the text file and the right page face is associated with a texture image corresponding to the sixth page of the text file.

FIG. 8R illustrates a user input 899R directed to the representation of the book 3D object 834. In various embodiments, the user input 899R corresponds to two contacts moving around a common center (e.g., a rotate gesture) detected at the location of the representation of the book 3D object 834.

Figure 8S:
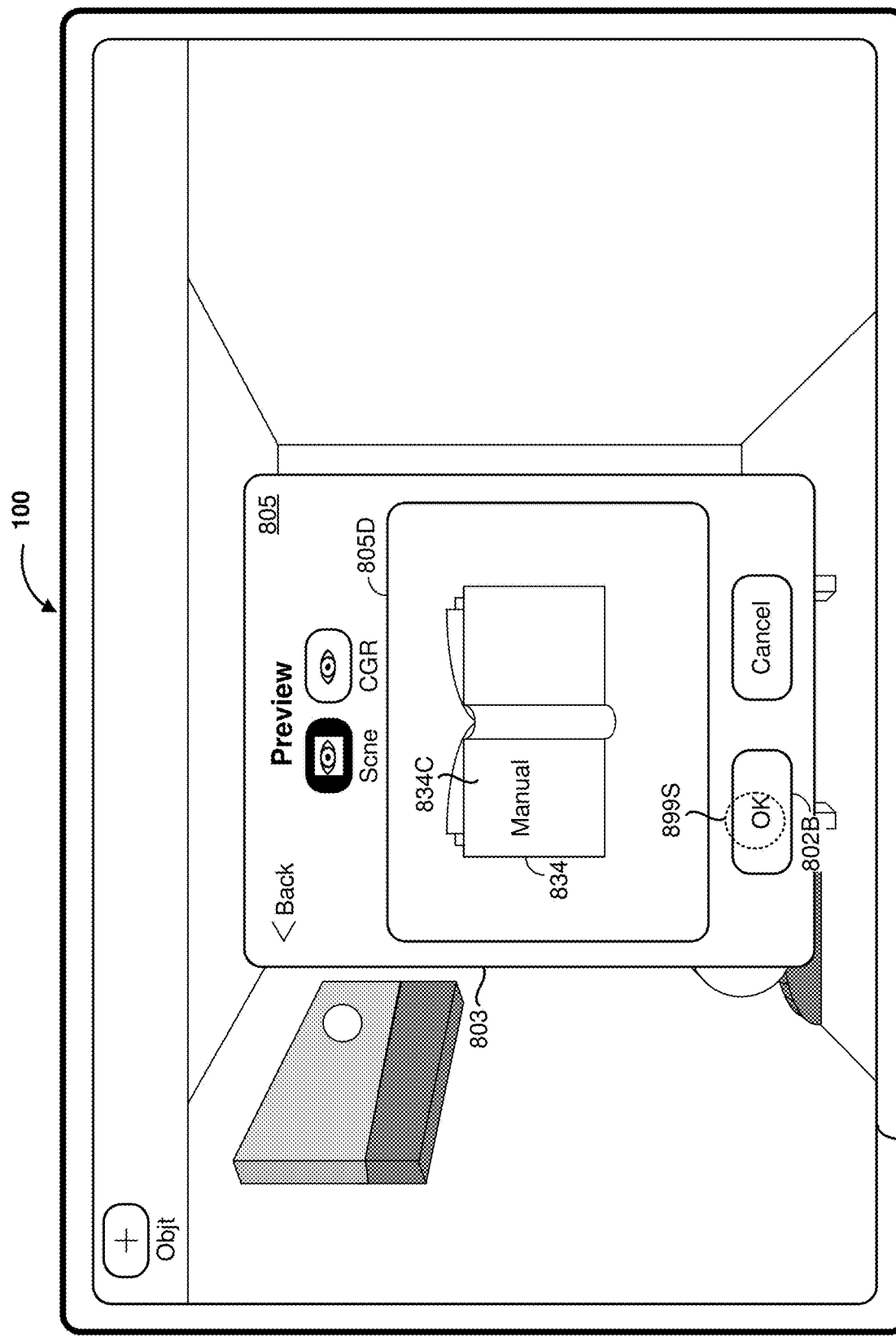

FIG. 8S illustrates the CGR environment user interface 801 in response to detecting the user input 899R directed to the representation of the book 3D object 834. In FIG. 8S, the view window 805D includes the representation of the book 3D object 834 displayed from a different perspective, e.g., rotated about an axis.

As noted above, the book 3D object is defined by a wireframe (or display mesh) and one or more texture images. The wireframe includes generally in the shape of an open book and includes a front face, a spine face, a back face, a left page face, and a right page face. The front face has a generally rectangular shape and is associated with a texture image including a title of the text file (which may be the name of the text file or derived from metadata of the file). Accordingly, the representation of the book 3D object 834 includes a front face 834C displaying the title of the text file.

FIG. 8S illustrates a user input 899S directed to the OK affordance 802B. In various embodiments, the user input 899S corresponds to a contact (e.g., a tap) detected at the location of the OK affordance 802B.

Figure 8T:
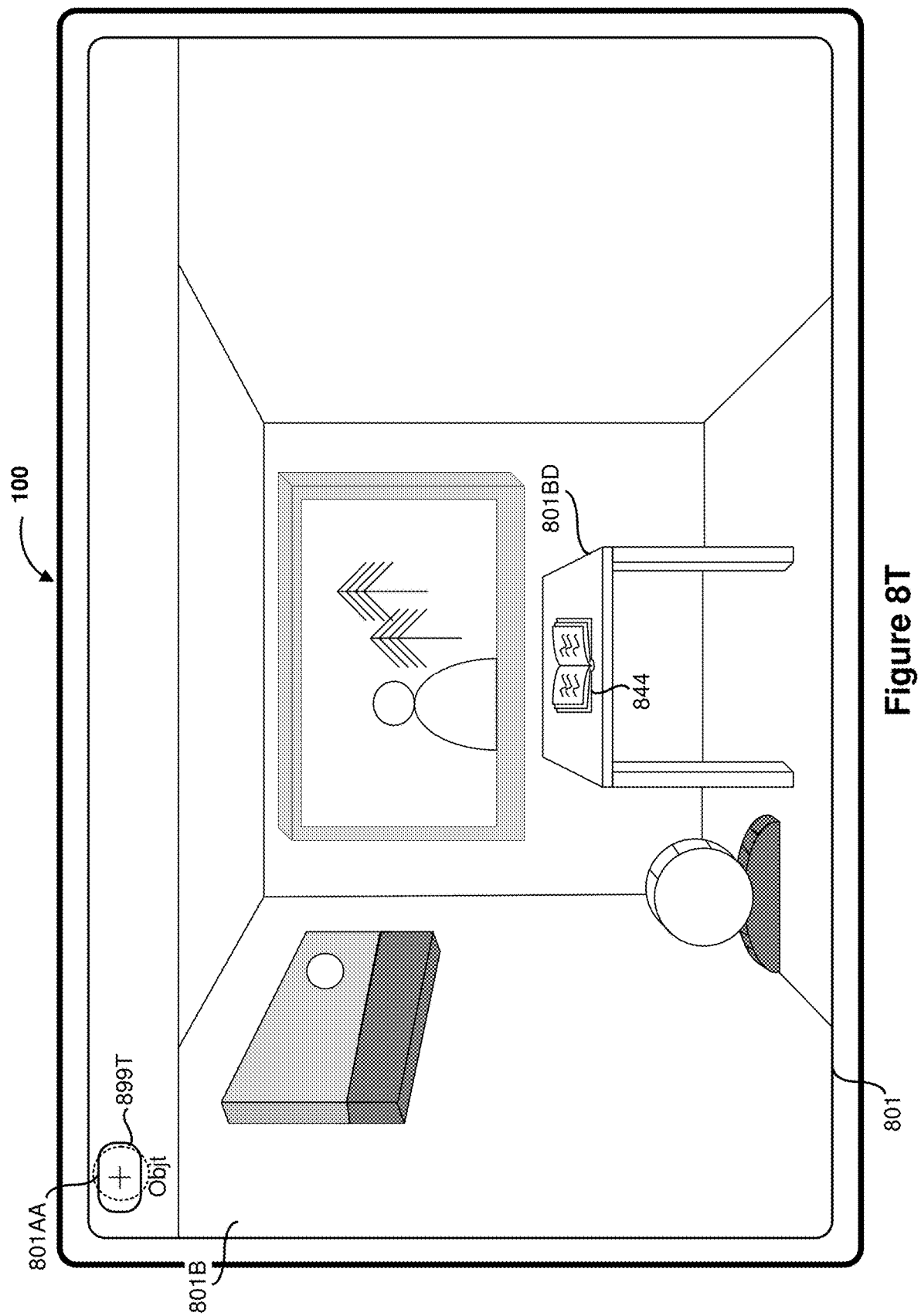

FIG. 8T illustrates the CGR environment user interface 801 in response to detecting the user input 899S directed to the OK affordance 802B. In FIG. 8T, the display region 801B includes a representation of the book 3D object 844 displayed on the representation of the table 801BD.

FIG. 8T illustrates a user input 899T directed to the object addition affordance 801AA. In various embodiments, the user input 899T corresponds to a contact (e.g., a tap) detected at the location of the object addition affordance 801AA.

Figure 8U:
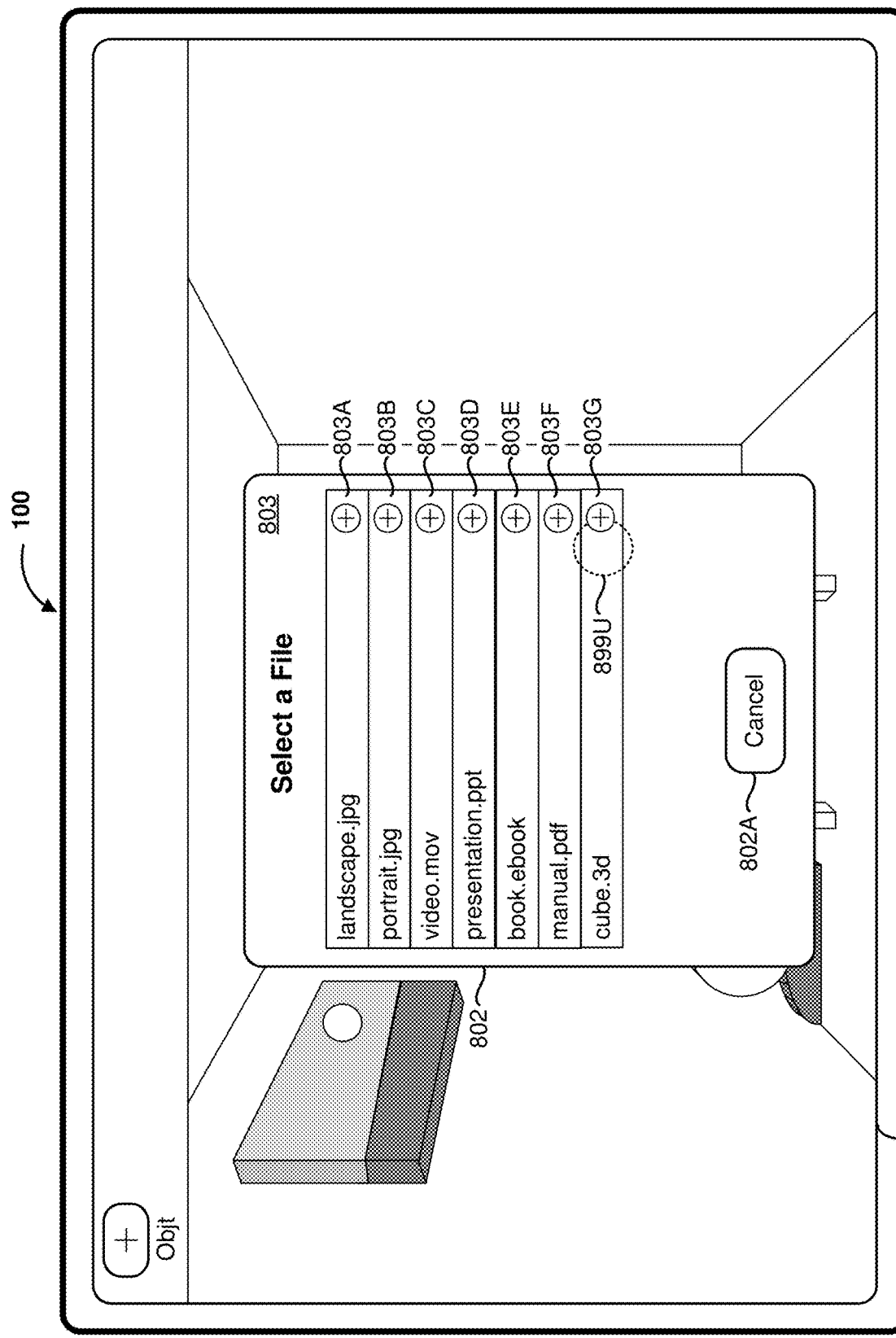

FIG. 8U illustrates the CGR environment user interface 801 in response to detecting the user input 899T directed to the object addition affordance 801AA. In FIG. 8U, the CGR environment user interface 801 includes the object addition user interface 802 in the form of a pop-up window. In FIG. 8U, the object addition user interface 802 includes the file selection user interface 803 and the cancel affordance 802A. The file selection user interface 803 includes the plurality of file selection affordances 803A-803G.

FIG. 8U illustrates a user input 899U directed to the seventh file selection affordance 803G. In various embodiments, the user input 899U corresponds to a contact (e.g., a tap) detected at the location of the seventh file selection affordance 803G.

Figure 8V:
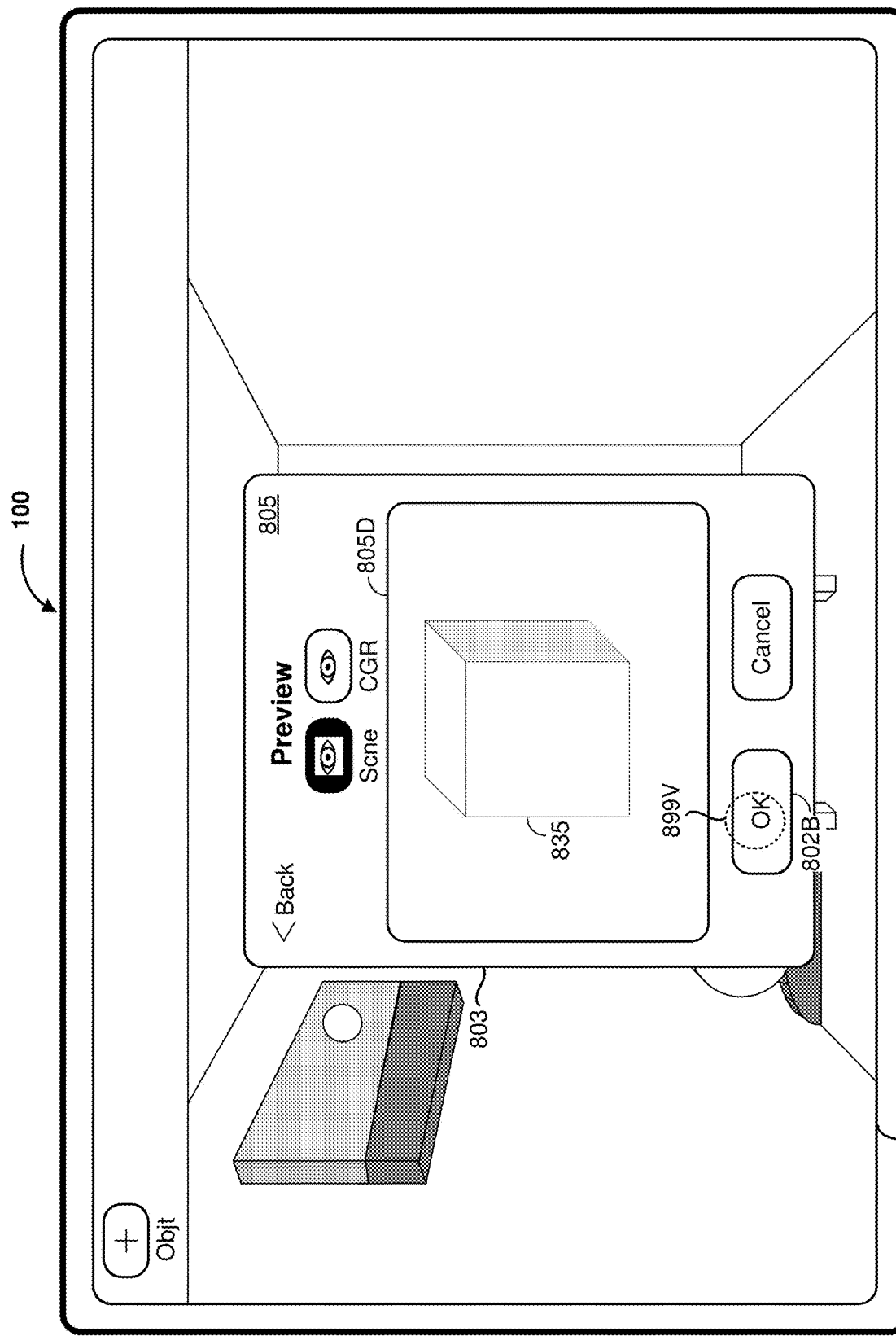
Figure 8W:
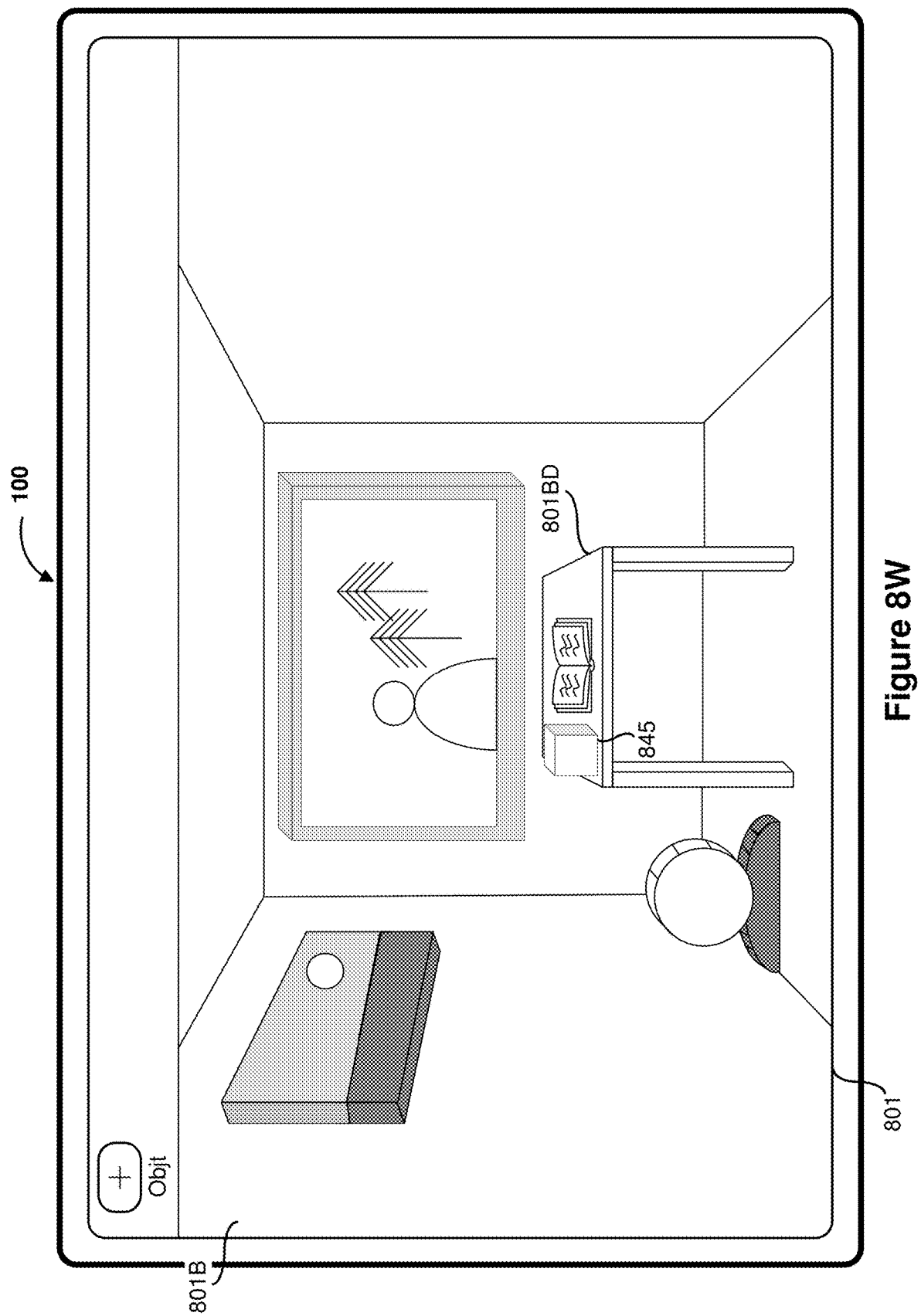

FIG. 8V illustrates the CGR environment user interface 801 in response to detecting the user input 899U directed to the seventh file selection affordance 803G. In FIG. 8V, based on the file type (e.g., a 3D object file) of the selected file (e.g., "cube.3D"), the object addition user interface 802 includes the preview user interface 805. The 3D object file represents a cube 3D object. The preview user interface 805 includes the view window 805D presenting a representation of the cube 3D object 835.

FIG. 8V illustrates a user input 899V directed to the OK affordance 802B. In various embodiments, the user input 899V corresponds to a contact (e.g., a tap) detected at the location of the OK affordance 802B.

FIG. 8W illustrates the CGR environment user interface 801 in response to detecting the user input 899V directed to the OK affordance 802B. In FIG. 8W, the display region 801B includes a representation of the cube 3D object 845 displayed on the representation of the table 801BD.

FIG. 9 is a flowchart representation of a method 900 of generating a 3D object in accordance with some embodiments. In various embodiments, the method 900 is performed by a device with one or more processors, non-transitory memory, a display, and one or more input devices (e.g., the portable multifunctional device 100 of FIG. 1A or HMD 520B of FIG. 7). In some embodiments, the method 900 is performed by processing logic, including hardware, firmware, software, or a combination thereof. In some embodiments, the method 900 is performed by a processor executing instructions (e.g., code) stored in a non-transitory computer-readable medium (e.g., a memory).

The method 900 begins, at block 910, with the device receiving, via the one or more input devices, a user input selecting a file representing two-dimensional (2D) content and having a file type. For example, in FIG. 8B, the device 100 receives the user input 899B directed to the first file selection affordance 803A selecting the first image file representing a 2D image and having an image file type. As another example, in FIG. 8G, the device 100 receives the user input 899G directed to the second file selection affordance 803B selecting the second image file representing a 2D image and having an image file type. As another example, in FIG. 8K, the device 100 receives the user input 899K directed to the third file selection affordance 803C selecting the video file representing a 2D video and having a video file type. As another example, in FIG. 8P, the device 100 receives the user input 899P directed to the sixth file selection .affordance 803F selecting the PDF file representing 2D page content (including text) and having a page file type.

The method 900 continues, in block 920, with the device receiving, via the one or more input devices, a user input requesting generation of a three-dimensional (3D) object based on the file. For example, in FIG. 8C, the device 100 receives the user input 899C directed to the canvas affordance 804A and, in response, displays a representation of a generated canvas 3D object 831 in the view window 805D in FIG. 8D. As another example, in FIG. 8D, the device 100 receives the user input 899D directed to the OK affordance 802B and, in response, displays a representation of a generated canvas 3D object 841 in the display region 801B in FIG. 8E.

The method 900 continues, in block 930, with the device generating, based on the file type, a 3D object representing the 2D content. In various embodiments, the file type of the file is determined based on a file extension of the file. In various embodiments, the file type of the file is determined based on the 2D content represented by the file. In various embodiments, generating, based on the file type, the 3D object representing the 2D content includes determining that the file type is an image file type, wherein the 2D content include an image and, in response to determining that the file type is an image file type, generating a canvas 3D object including a front face associated with a texture image representing the image. For example, in FIG. 8D, in response to determining that the file type of the first image file is an image file type, wherein the 2D content includes a first, the device 100 generates and displays a representation of the canvas 3D object 831 including a front face 831A associated with a texture image representing the first image. In various embodiments, the canvas 3D object further includes an edge face perpendicular to the front face and associated with a texture image corresponding to a stretching of pixels on the edge of the image. For example, in FIG. 8D, the representation of the canvas 3D object 831 includes an edge face 831B corresponding to a stretching of pixels on the edge of the first image.

In various implementations, the file that is a image file type is an image (e.g., a JPG file or a GIF file) or an image with depth information.

In various embodiments, generating, based on the file type, the 3D object representing the 2D content includes determining that the file type is an image file type, wherein the 2D content includes an image and, in response to determining that the file type is an image file type, generating a cut-out 3D object including a front face having a shape of a foreground of the image and associated with a texture image representing the foreground of the image. For example, in FIG. 8I, in response to determining that the file type of the second image file is an image file type, wherein the 2D content includes the second, the device 100 generates and displays a representation of the cut-out 3D object 832 including a front face 832A having a shape of the foreground of the second image and associated with a texture image representing the foreground of the second image.

In various embodiments, generating, based on the file type, the 3D object representing the 2D content includes determining that the file type is a video file type, wherein the 2D content includes a video, and, in response to determining that the file type is a video file type, generating a television 3D object including a front face associated with a texture image including a display region representing the video. For example, in FIG. 8M, in response to determining that the file type of the video file is a video file type, wherein the 2D content includes a video, the device 100 generates and displays a representation of the flat screen TV 3D object 833 including a front face associated with a texture image including a display region 833A representing the video.

In various implementations, the file that is a video file type is a MOV file, an MPG file, or an AVI file.

In various embodiments, generating, based on the file type, the 3D object representing the 2D content includes determining that the file type is a page file type, wherein the 2D content includes one or more pages of content, and, in response to determining that the file type is a page file type, generating a book 3D object including a first page face associated with a texture image representing a first page of the one or more pages of content. For example, in FIG. 8R, in response to determining that the file type of the PDF file is a page file type, wherein the 2D content includes one or more pages of content, the device 100 generates and displays a representation of the book 3D object 834 including a left page face 834A associated with a texture image representing a first page of the one or more pages of content. In various embodiments, in response to a user input directed to the book 3D object in a CGR environment, the first page face is associated with a texture image representing a second page of the one or more pages of content. In various embodiments, the book 3D object includes a second page face associated with a texture image representing a second page of the one or more pages of content. For example, in FIG.

8R, the representation of the book 3D object 834 includes right page face 834B associated with a texture image presenting a second page of the one or more pages of content. In various embodiments, the book 3D object includes a front face associated with a texture image representing metadata of the file. For example, in FIG. 8S, the representation of the book 3D object 834 includes a front page face 834C associated with a texture image representing a title of the file.

In various implementations, the file that is a page file type (or text file type) is a word processing document (e.g., a DOC file or a TXT file), an ebook (e.g., an EPUB file or an IBOOKS file), a slide deck presentation (e.g., a PPT file or KEY file).

In various embodiments, generating, based on the file type, the 3D object representing the 2D content includes presenting, based on the file type, a set of options, receiving, via the one or more input devices, a user input selecting one of the set of options, and generating, based on the selected one of the set of options, the 3D object representing the 2D content. For example, in FIG. 8C, the device 100 presents the image options user interface 804 including the plurality of image option selection affordances 804A-804D.

In various embodiments, the method 900 further includes storing the 3D object as a 3D object file.

In various embodiments, the method 900 further includes displaying the 3D object representing the 2D content. For example, in FIG. 8D, the device 100 displays the representation of the canvas 3D object 831 in the view window 805D. As another example, in FIG. 8E, the device 100 displays the representation of the canvas 3D object 841 in the display region 801B.

In various implementations, displaying the 3D object representing the 2D content includes performing plane detection and/or object detection and displaying the 3D object anchored to a particular type or plane and/or a particular type of object based on the file type. For example, a canvas 3D object is displayed on a vertical plane and/or a wall, a cut-out 3D object is displayed on a horizontal plane and/or a floor, a television 3D object is displayed on a vertical plane and/or a wall, and a book 3D object is displayed on a horizontal plane and/or a table.

In various embodiments, the method 900 further includes receiving user input that spatially manipulates the 3D object and changes display of the 3D object. For example, in FIG. 8E, the device 100 detects the user input 899E directed to the representation of the canvas 3D object 841 and, in response, displays the representation of the canvas 3D object 841 at a different location in FIG. 8E.

It should be understood that the particular order in which the operations in FIG. 9 have been described is merely example and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., as described with respect to FIGS. 1A, 3, and 5) or application specific chips. Further, the operations described above with reference to FIG. 9, optionally, implemented by components depicted in FIGS. 1A-1B. For example, the user inputs and user interface elements are, optionally, implemented by the event sorter 170, the event recognizer 180, and the event handler 190. The event monitor 171 in the event sorter 170 detects a contact the on touch-sensitive display system 112, and the event dispatcher module 174 delivers the event information to the application 136-1. A respective event recognizer 180 of the application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, the event recognizer 180 activates an event handler 190 associated with the detection of the event or sub-event. The event handler 190 optionally utilizes or calls the data updater 176 or the object updater 177 to update the application internal state 192. In some embodiments, the event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

A first embodiment is a method comprising receiving, via one or more input devices, a user input selecting a file representing two-dimensional (2D) content and having a file type; receiving, via the one or more input devices, a user input requesting generation of a three-dimensional (3D) object based on the file; and generating, based on the file type, a 3D object representing the 2D content.

A second embodiment is substantially similar to the first embodiment, wherein generating, based on the file type, the 3D object representing the 2D content includes determining that the file type is an image file type, wherein the 2D content includes an image; and in response to determining that the file type is an image file type, generating a canvas 3D object including a front face associated with a texture image representing the image.

A third embodiment is substantially similar to the second embodiment, wherein the canvas 3D object further includes an edge face perpendicular to the front face and associated with a texture image corresponding to a stretching of pixels on the edge of the image.

A fourth embodiment is substantially similar to first embodiment, wherein generating, based on the file type, the 3D object representing the 2D content includes determining that the file type is an image file type, wherein the 2D content includes an image; and in response to determining that the file type is an image file type, generating a cut-out 3D object including a front face having a shape of a foreground of the image and associated with a texture image representing the foreground of the image.

A fifth embodiment is substantially similar to the first embodiment, wherein generating, based on the file type, the 3D object representing the 2D content includes determining that the file type is a video file type, wherein the 2D content includes a video; and in response to determining that the file type is a video file type, generating a television 3D object including a front face associated with a texture image including a display region representing the video.

A sixth embodiment is substantially similar to the first embodiment wherein generating, based on the file type, the 3D object representing the 2D content includes determining that the file type is a page file type, wherein the 2D content includes one or more pages of content; and in response to determining that the file type is a page file type, generating a book 3D object including a first page face associated with a texture image representing a first page of the one or more pages of content.

A seventh embodiment is substantially similar to the sixth embodiment, wherein, in response to a user input directed to the book 3D object in a CGR environment the first page face is associated with a texture image representing a second page of the one or more pages of content.

An eighth embodiment is substantially similar to the sixth embodiment, wherein the book 3D object includes a second page face associated with a texture image representing a second page of the one or more pages of content.

A ninth embodiment is substantially similar to any of the sixth through eighth embodiments, wherein the book 3D object includes front face associated with a texture image representing metadata of the file.

A tenth embodiment is substantially similar to any of the first through ninth embodiments, wherein generating, based on the file type, the 3D object representing the 2D content includes presenting, based on the file type, a set of options; receiving, via the one or more input devices, a user input selecting one of the set of options; and generating, based on the selected one of the set of options, the 3D object representing the 2D content.

An eleventh embodiment is substantially similar to any of the first through tenth embodiments, wherein the method further comprises displaying the 3D object representing the 2D content.

A twelfth embodiment is substantially similar to the eleventh embodiment, wherein the method further comprises receiving user input that spatially manipulates the 3D object and changes display of the 3D object.

A thirteenth embodiment is substantially similar to any of the first through twelfth embodiments, wherein the method further comprises storing the 3D object as a 3D object file.

What is claimed is:

1. A method comprising:
    receiving, via one or more input devices, a first user input selecting a file representing two-dimensional (2D) content and having a file type, wherein the first user input is directed to a first file selection affordance within a file selection user interface;
    in accordance with receiving the first user input, determining an options user interface based on the file type, wherein the image options user interface includes:
        in response to the file type of the 2D content being a first file type, a first set of 3D object selection affordances that corresponds to the first file type; and
        in response to the file type of the 2D content being a second file type that is different from the first file type, a second set of 3D object selection affordances that corresponds to the second file type, wherein the second set of 3D object selection affordances is different from the first set of 3D object selection affordances;
    while displaying the options user interface including the one or more 3D object selection affordances, receiving, via the one or more input devices, a second user input requesting generation of a 3D object based on the file, wherein the second user input selects a particular 3D object selection affordance, of the first set of 3D object selection affordances or the second set of 3D object select affordances, from the options user interface, and wherein the particular 3D object selection affordance is associated with a corresponding 3D object option; and
    generating, based on the file type, a 3D object representing the 2D content by displaying the 2D content on at least a portion of the corresponding 3D object option.

2. The method of claim 1, wherein generating, based on the file type, the 3D object representing the 2D content includes:
    determining that the file type is an image file type, wherein the 2D content includes an image; and
    in response to determining that the file type is an image file type, generating a canvas 3D object including a front face associated with a texture image representing the image.

3. The method of claim 2, wherein the canvas 3D object further includes an edge face perpendicular to the front face and associated with a texture image corresponding to a stretching of pixels on the edge of the image.

4. The method of claim 1, wherein generating, based on the file type, the 3D object representing the 2D content includes:
    determining that the file type is an image file type, wherein the 2D content includes an image; and
    in response to determining that the file type is an image file type, generating a cut-out 3D object including a front face having a shape of a foreground of the image and associated with a texture image representing the foreground of the image.

5. The method of claim 1, wherein generating, based on the file type, the 3D object representing the 2D content includes:
    determining that the file type is a video file type, wherein the 2D content includes a video; and
    in response to determining that the file type is a video file type, generating a television 3D object including a front face associated with a texture image including a display region representing the video.

6. The method of claim 1, wherein generating, based on the file type, the 3D object representing the 2D content includes:
    determining that the file type is a page file type, wherein the 2D content includes one or more pages of content; and
    in response to determining that the file type is a page file type, generating a book 3D object including a first page face associated with a texture image representing a first page of the one or more pages of content.

7. The method of claim 6, wherein, in response to a user input directed to the book 3D object in a CGR environment the first page face is associated with a texture image representing a second page of the one or more pages of content.

8. The method of claim 6, wherein the book 3D object includes a second page face associated with a texture image representing a second page of the one or more pages of content.

9. The method of claim 6, wherein the book 3D object includes a front face associated with a texture image representing metadata of the file.

10. The method of claim 1, further comprising displaying the 3D object representing the 2D content.

11. The method of claim 10, further comprising receiving user input that spatially manipulates the 3D object and changes display of the 3D object.

12. The method of claim 11, further comprising storing the 3D object as a 3D object file.

13. The method of claim 1, wherein the options user interface includes:

a canvas affordance or a cut-out affordance in response to the file type of the 2D content being an image file type;

a flat screen TV affordance or a computer monitor affordance in response to the file type of the 2D content being a video file type; and a book affordance, a paper stack affordance, or a presentation screen affordance in response to the file type of the 2D content being a text file type.

14. The method of claim 1, wherein the 3D object is defined in part by a wireframe that corresponds to the first file type.

15. The method of claim 1, wherein the 3D object is defined in part by a display mesh that corresponds to the first file type.

16. The method of claim 1, wherein the first file type includes one of an image file type, a video file type, and a page file type, and wherein the second file type includes a different one of the image file type, the video file type, and the page file type.

17. An electronic device comprising:
one or more input devices;
a non-transitory memory; and
one or more processors to:
receive, via one or more input devices, a first user input selecting a file representing two-dimensional (2D) content and having a file type, wherein the first user input is directed to a first file selection affordance within a file selection user interface;
in accordance with receiving the first user input, determine an options user interface based on the file type, wherein the imago options user interface includes;
in response to the file type of the 2D content being a first file type, a first set of 3D object selection affordances that corresponds to the first file type; and
in response to the file type of the 2D content being a second file type that is different from the first file type, a second set of 3D object selection affordances that corresponds to the second file type, wherein the second set of 3D object selection affordances is different from the first set of 3D object selection affordances;
while displaying the options user interface including the one or more 3D object selection affordances, receive, via the one or more input devices, a second user input requesting generation of a 3D object based on the file, wherein the second user input selects a particular 3D object selection affordance, of the first set of 3D object selection affordances or the second set of 3D object select affordances, from the options user interface, and wherein the particular 3D object selection affordance is associated with a corresponding 3D object option; and
generate, based on the file type, a 3D object representing the 2D content by displaying the 2D content on at least a portion of the corresponding 3D object option.

18. The electronic device of claim 17, wherein the one or more processors are configured to generate, based on the file type, the 3D object representing the 2D content by:
determining that the file type is an image file type, wherein the 2D content includes an image; and
in response to determining that the file type is an image file type, generating a canvas 3D object including a front face associated with a texture image representing the image.

19. The electronic device of claim 18, wherein the canvas 3D object further includes an edge face perpendicular to the front face and associated with a texture image corresponding to a stretching of pixels on the edge of the image.

20. The electronic device of claim 17, wherein the one or more processors are configured to generate, based on the file type, the 3D object representing the 2D content by:
determining that the file type is an image file type, wherein the 2D content includes an image; and
in response to determining that the file type is an image file type, generating a cut-out 3D object including a front face having a shape of a foreground of the image and associated with a texture image representing the foreground of the image.

21. The electronic device of claim 17, wherein the options user interface includes:
a canvas affordance or a cut-out affordance in response to the file type of the 2D content being an image file type;
a flat screen TV affordance or a computer monitor affordance in response to the file type of the 2D content being a video file type; and
a book affordance, a paper stack affordance, or a presentation screen affordance in response to the file type of the 2D content being a text file type.

22. The electronic device of claim 17, wherein the 3D object is defined in part by a wireframe that corresponds to the first file type.

23. A non-transitory computer-readable medium having instructions encoded thereon which, when executed by an electronic device including one or more input devices and one or more processors, causes the electronic device to:
receive, via the one or more input devices, a first user input selecting a file representing two-dimensional (2D) content and having a file type, wherein the first user input is directed to a first file selection affordance within a file selection user interface;
in accordance with receiving the first user input, determine an options user interface based on the file type, wherein the options user interface includes:
in response to the file type of the 2D content being a first file type, a first set of 3D object selection affordances that corresponds to the first file type; and
in response to the file type of the 2D content being a second file type that is different from the first file type, a second set of 3D object selection affordances that corresponds to the second file type, wherein the second set of 3D object selection affordances is different from the first set of 3D object selection affordances;
while displaying the options user interface including the one or more 3D object selection affordances, receive, via the one or more input devices, a second user input requesting generation of a 3D object based on the file, wherein the second user input selects a particular 3D object selection affordance, of the first set of 3D object selection affordances or the second set of 3D object select affordances, from the options user interface, and wherein the particular 3D object selection affordance is associated with a corresponding 3D object option; and
generate, based on the file type, a 3D object representing the 2D content by displaying the 2D content on at least a portion of the corresponding 3D object option.

24. The non-transitory computer-readable medium of claim 23, wherein the instructions, when executed by the electronic device, cause the electronic device to generate, based on the file type, the 3D object representing the 2D content by:

determining that the file type is an image file type, wherein the 2D content includes an image; and in response to determining that the file type is an image file type, generating a canvas 3D object including a front face associated with a texture image representing the image.

25. The non-transitory computer-readable medium of claim 23, wherein the options user interface includes:
a canvas affordance or a cut-out affordance in response to the file type of the 2D content being an image file type;
a flat screen TV affordance or a computer monitor affordance in response to the file type of the 2D content being a video file type; and
a book affordance, a paper stack affordance, or a presentation screen affordance in response to the file type of the 2D content being a text file type.

26. The non-transitory computer-readable medium of claim 23, wherein the 3D object is defined in part by a display mesh that corresponds to the first file type.

27. The non-transitory computer-readable medium of claim 23, wherein the first file type includes one of an image file type, a video file type, and a page file type, and wherein the second file type includes a different one of the image file type, the video file type, and the page file type.

* * * * *